United States Patent
Natarajan et al.

(10) Patent No.: US 12,426,102 B2
(45) Date of Patent: Sep. 23, 2025

(54) METHODS, APPARATUSES, AND COMPUTER PROGRAM PRODUCTS FOR SUPPORTING SIMULTANEOUS ACCESS TO MUTALLY ISOLATED NETWORK SLICES

(71) Applicant: NOKIA TECHNOLOGIES OY, Espoo (FI)

(72) Inventors: Rajesh Babu Natarajan, Bangalore (IN); Alessio Casati, West Molesey (GB); Srinivas Bandi, Bangalore (IN); Betsy Covell, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 383 days.

(21) Appl. No.: 18/041,429

(22) PCT Filed: Aug. 3, 2021

(86) PCT No.: PCT/EP2021/071625
§ 371 (c)(1),
(2) Date: Feb. 13, 2023

(87) PCT Pub. No.: WO2022/037931
PCT Pub. Date: Feb. 24, 2022

(65) Prior Publication Data
US 2023/0319906 A1  Oct. 5, 2023

(30) Foreign Application Priority Data
Aug. 19, 2020  (IN) .............................. 202041035753

(51) Int. Cl.
H04W 76/10 (2018.01)
H04W 48/18 (2009.01)
(Continued)

(52) U.S. Cl.
CPC ........... *H04W 76/10* (2018.02); *H04W 48/18* (2013.01); *H04W 60/04* (2013.01); *H04W 76/20* (2018.02)

(58) Field of Classification Search
None
See application file for complete search history.

(56) References Cited

U.S. PATENT DOCUMENTS 10,893,455 B2 * 1/2021 Zee ........................ H04W 76/11
10,979,998 B2 * 4/2021 Vikberg ................ H04W 76/10
(Continued)

*Primary Examiner* — Eunsook Choi
(74) *Attorney, Agent, or Firm* — Carter, DeLuca & Farrell LLP

(57) ABSTRACT

Methods, apparatuses, and computer program products are described that support access to multiple mutually exclusive, isolated, and/or disjointed network slices by User Equipment, UE, across one or more networks. The UE connects (1102) to multiple network slices via a Radio Access Network, RAN, by way of one or more Radio Resource Control, RRC, connections. The RRC connections are maintained (1104) between the UE and a respective network slice by switching the connection to inactive or idle when another RRC connection needs to be established. The UE and/or the RAN switches (1106) an RRC connection from an inactive state to an active state based on a trigger condition such as receipt of a notification that downlink data is available over the inactive RRC connection. A Unified Data Management Function, UDM, stores and updates registration state information for the UE and multiple Access and Mobility Management Functions, AMFs.

8 Claims, 15 Drawing Sheets

(51) Int. Cl.
*H04W 60/04* (2009.01)
*H04W 76/20* (2018.01)

(56) References Cited

U.S. PATENT DOCUMENTS

| | | | |
|---|---|---|---|
| 11,570,694 B2* | 1/2023 | Choi | H04W 48/08 |
| 11,611,912 B2* | 3/2023 | Han | H04W 4/06 |
| 12,261,891 B2* | 3/2025 | Qiao | H04W 4/24 |
| 2021/0258865 A1* | 8/2021 | Park | H04W 48/16 |
| 2022/0210726 A1* | 6/2022 | Sillanpaa | H04W 48/18 |
| 2022/0248318 A1* | 8/2022 | Qiao | H04W 60/04 |
| 2023/0156583 A1* | 5/2023 | Murray | H04W 48/20 370/329 |

* cited by examiner

METHODS, APPARATUSES, AND COMPUTER PROGRAM PRODUCTS FOR SUPPORTING SIMULTANEOUS ACCESS TO MUTALLY ISOLATED NETWORK SLICES

CROSS-REFERENCE TO RELATED APPLICATIONS

This application is a national phase entry of International Application No. PCT/EP2021/071625, filed Aug. 3, 2021, which claims priority to Indian Application No. 202041035753, filed Aug. 19, 2020, the contents of which are hereby incorporated by reference in their entirety.

TECHNOLOGICAL FIELD

An example embodiment relates generally to supporting simultaneous access by user equipment to mutually exclusive, isolated, or disjointed network slices.

BACKGROUND

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G network has been designed as a Service Based Architecture (SBA) or, in other words, a system architecture in which the system functionality is achieved by a set of network functions providing services to other authorized network functions to access their services.

The 5G network system allows for the support of network slices, which are end-to-end logical networks which support a certain set of network functions. As such, a network slice is a logical network infrastructure which provides specific network capabilities and network characteristics. Across a 5G network, comprising a plurality of network slices, particular network slices can be configured to support particular features (e.g., hardware specifications, network functions, domain access, etc.) that are not common to all network slices.

BRIEF SUMMARY

Methods, apparatuses, and computer program products are disclosed which facilitate access to mutually exclusive, isolated, and/or disjointed network slices by User Equipment (UE) across one or more Public Land Mobile Networks (PLMNs). The present disclosure provides procedures related to user equipment connecting to, maintaining connections with, and/or switching between connection of multiple isolated and/or disjointed network slices by way of Radio Resource Control (RRC) messaging with at least a shared Radio Access Network (RAN) and/or one or more Access and Mobility Management Functions (AMFs). The present disclosure provides procedures related to storing, maintaining, and updating user equipment connection information by a Unified Data Management Function (UDM) for one or more network slices. An example embodiment includes a network infrastructure which transmits and receives information (e.g., RRC setup information, network slice identification information, user equipment identification information, downlink data, uplink data, etc.), by way of at least a radio access network and/or access and mobility management function, to provide and maintain a plurality of network slice connections to a user equipment. In accordance with an example embodiment the user equipment can be registered with a plurality of network slices and maintain connections to each of the plurality of network slices which is monitored and recorded by the unified data management function. In accordance with such embodiments, the user equipment has an active connection with one network slice of the plurality of network slices while the user equipment's connections to the other network slices of the plurality of network slices are maintained as inactive connections. In some embodiments, the user equipment can request, via the radio access network, to inactive the active connection with one network slice and then activate an inactive connection with one of the other network slices. In some embodiments, the user equipment can dynamically switch the active connection between the plurality of network slices to receive downlink data when such data is made available by a network slice. In some embodiments, the user equipment can dynamically switch the active connection between the plurality of network slices to cause transmission of uplink data when such data needs to be transmitted to a network slice in order for the user equipment to utilize one or more services associated with the network slice. In some embodiments, one or more network slices may be configured to communicate only with particular cells of a RAN. In some embodiments, one or more network slices may be configured to cause communication transmissions at one or more particular frequencies over a RAN. In some embodiments, one or more network slices may be configured to operate at one or more particular sub-bands.

It will be appreciated that with the expansion of 5G networks and the deployment of more network slices to render specialized services, the likelihood that a user equipment is subscribed to and requires connection with multiple network slices increases. Moreover, even though some network slices, and services thereof, can be simultaneously provided to a user equipment there is a growing number of network slices which are deployed across mutually exclusive networks (e.g., isolated, disjointed, etc.). For example, network slices may be configured with separate user plane paths of different Protocol Data Unit (PDU) sessions and accordingly would be disjointed and thus the user equipment could only access a single network slice of this configuration at a time. Moreover, for example, the slices of a network may be isolated from each other, such as for security purposes (e.g., limit cyber-attacks, restrict private information, etc.), and therefore user equipment would be restricted by the network (e.g., Core Network (CN) functions, AMF, etc.), or even the RAN, to only access a single isolated slice per connection. Additionally, there are multiple other related factors for network slice deployments and isolation leading to operational and service requirements, for example, enterprise use, personal use, security requirements, general public use, public safety use, frequency limitation, location restriction, the like, or combinations thereof.

The inventors have identified many problems associated with traditional network slice deployments and in the present disclosure propose solutions to improve upon these shortcomings. For example, in an instance user equipment requires access to disjoint and/or isolated network slices, there arises a problem of access management and signaling overhead. In accordance with traditional systems, the user equipment needs to register and deregister each time access to another disjoint and/or isolated network slice service is required. For example, when the user equipment needs to switch between applications and/or services provided by different disjoint and/or isolated network slices. The inventors have identified a need for user equipment to dynamically switch between accessing such disjoint and/or isolated network slices while maintaining a connection to each required network and/or network slice. Dynamically switching between disjoint and/or isolated network slices improves signaling overhead traffic, network resource usage, service response time, and aids in better access management (e.g., reduced signaling delay, etc.), among other benefits and improvements over traditional system deployments.

In order to overcome the aforementioned problems associated with traditional system the present disclosure provides procedures related to user equipment connecting to, maintaining connections with, and/or switching between connection of multiple disjoint and/or isolated network slices by way of RRC messaging with at least a RAN and/or one or more AMFs. In some embodiments, the network's UDM provides means for the storage, maintenance, and update of user equipment connection information of one or more network slices. For example, the UDM may receive and store user equipment connection information received from one or more AMFs specifying identification data associated with a user equipment and the details of the registration procedures between the respective AMF and the user equipment. For example, as a result of the registration procedure, the identification information associated with the AMF serving the UE with access to a network slice will be stored and maintained by the UDM. It will be appreciated that by maintaining and updating such user equipment connection information the user equipment does not need to disconnect and register with the network each time services are required from another network slice not actively connected to the user equipment.

In some embodiment, user equipment and a CN (e.g., AMF, etc.) are configured to support multiple registration states based on the user equipment's requested network slices. For example, a first AMF may register the user equipment to provide services rendered by a first network slice and a second AMF may register the user equipment to provide services rendered by a second network slice. In accordance with such example embodiments, a RAN may be configured to select the first AMF for the first network slice and the second AMF for the second network slice based on an indicated Single Network Slice Selection Assistance Information (S-NSSAI) or a Globally Unique Temporary Identifier (GUTI). In some embodiments, the S-NSSAI is transmitted to the RAN from the user equipment by way of an RRC connection request. In some embodiments, the GUTI is transmitted to the RAN from the user equipment by way of an RRC connection request. In an instance, the GUTI is not available to properly direct the user equipment to the required AMF during the first time the user equipment registers with the network then the RAN may utilize the S-NSSAI to determine the required AMF, otherwise the RAN utilized the GUTI. In some embodiments, the second AMF is associated with the same network as the first AMF. In some embodiments, the first network slice and the second network slice are disjoint and/or isolated from one another on the same network. In some embodiments, the first network slice and the second network slice are configured on different independent networks.

In accordance with an example embodiment, during a user equipment's first registration request with a network, for example, a CN (e.g., AMF, etc.) associated therewith, may be configured to indicate a rejected S-NSSAI list to the user equipment. For example, the CN may transmit an indication of rejected S-NSSAIs in a registration acceptance response to the user equipment. Additionally, the CN may provide an indication of which of the rejected S-NSSAIs would require the user equipment to establish a separate RRC connection. The rejected S-NSSAIs may be determined based on the network deployment and corresponding network deployment and/or configuration information accessible by the CN. In some embodiments, the rejected S-NSSAIs list may be configured by the CN, or a portion thereof, based on localized network slice configurations at one or more AMFs. In some embodiments, the AMF may receive information to be included in the rejected S-NSSAIs list from a Network Slice Selection Function (NSSF) before or during registration procedures with one or more user equipment. In some embodiments, information pertinent to the rejected S-NSSAIs list may be provided by one or more of a network function, a network slice, a network entity, the like, or combinations thereof to the CN for inclusion in the rejected S-NSSAIs list. In some embodiments, the CN may cause transmission of a plurality of rejected S-NSSAIs lists to a user equipment. For example, each time the user equipment registers with another network slice associated with the CN then the CN may cause transmission of another rejected S-NSSAIs list to the user equipment. In some embodiments, the rejected S-NSSAIs list may include new or updated information not previously received by the user equipment. In some embodiments, the rejected S-NSSAIs list may provide information related to the disjoint and/or isolated network slices. For example, the rejected S-NSSAIs list may indicate that one or more disjoint and/or isolated network slices are served by one or more different cells, different transmission frequencies, different sub-bands, the like, or combinations thereof.

Moreover, the present disclosure provides an example embodiment wherein the user equipment and the RAN maintain multiple RRC connections based on unique connection identification information. In some embodiments, when the user equipment registers an RRC connection via the RAN the user equipment identifies itself with unique user equipment identification information and the user equipment identifies the network slice with which to make the connection. In some embodiments, the user equipment identifies the network slice (e.g., a disjoint network slice, etc.) with which to make the connection by way of an S-NSSAI, GUTI, and/or another form of identification information unique to the requested network slice.

In some embodiments, user equipment may cause the establishment of an RRC connection by way of communication with at least a RAN and/or AMF. In some embodiments, user equipment may cause/trigger the release of an RRC connection by way of communication with at least a RAN and/or AMF. In some embodiments, the release of an RRC connection may comprise causing an inactivation of the RRC connection. For example the RRC connection to a first network slice may be made to be temporarily inactive, or suspend, while the user equipment activates, or resumes, and/or communicated over, another RRC connection to a second network slice. In some embodiments, one or more network entities (e.g., UE, RAN, AMF, etc.) may cause, or trigger, an RRC release with suspension configuration, wherein the suspension configuration is indicated in the RRC release and that is sufficient for both the UE and the RAN to understand that the RRC connection is suspended and moved to the RRC inactive state.

In accordance with some embodiments, an AMF, and/or other network entities, may provide RRC inactive assistance information to a RAN in order to assist one or more network entities in performing network triggered RRC release with suspension procedures. In some embodiments, one or more network entities may perform network triggered RRC release with suspension configuration in order to move user equipment from an RRC connected state to an RRC inactive state. In some embodiments, the RRC inactive assistance information may be based on a user equipment's application, and/or network resource, usage patterns.

Another example embodiment provides means for user equipment to switch between network slices (e.g., disjoint and/or isolated slices, etc.), by moving one or more RRC connections to the RRC inactive state. For example, an inactive application running on the user equipment may be associated with a first network slice and the RRC connection to that first network slice may be switched to the inactive state based on a lack of application usage. Moreover, another application associated with the user equipment may request a particular network service associated with a second network slice and, in response, the user equipment may move the RRC connection associated with the second network slice to an active state. In some embodiments, user equipment applications, and/or application usage data associated therewith, may further trigger one or more of an RRC release request, an RRC resume request, procedures associated therewith, the like, or combinations thereof. In an instance, a RAN maintains multiple RRC states for a user equipment, based on the S-NSSAI and/or GUTI, and at least one of the RRC connections is in an RRC connected state, or an active state, then it provide an indication to the user equipment not to trigger periodic RAN notification update procedures. In some embodiments, in an instance all RRC connections, associated with a user equipment, move to an inactive state then the RAN may be configured to provide an indication to the user equipment to cause the user equipment to perform periodic RAN notification update procedures. In accordance with such embodiments, the RAN may further be configured to provide an indication to the user equipment to cause the user equipment to provide a periodic timer for the periodic RAN notification update procedures.

In some embodiments, a network entity (e.g., UPF, AMF, etc.) may generate and/or cause transmission of downlink data notifications, transmitted at least partially via a RAN, to a user equipment, wherein the downlink data notifications indicate that downlink data is available from a network slice associated with the network entity. In some embodiment, the network entity (e.g., UPF, AMF, etc.) may generate and/or cause transmission of downlink data notifications for their associated network slice if the RRC connection between the user equipment and the network slice is set to an inactive, idle, or active state. In some embodiments, the downlink data notifications, transmitted at least partially via the RAN, to the user equipment may comprise a network slice identifier for the associated network slice. In some embodiments, downlink data notifications associated with a network slice in an inactive state or idle state may be transmitted, at least partially via the RAN, by way of the user equipment's RRC connection associated with a network slice in an active state. It will be appreciated that by utilizing an active RRC connection to transmit information associated with one or more inactive or idle RRC connections the RAN is not required to perform additional procedures associated with paging the user equipment. In other words, the user equipment can more efficiently switch from a first active network slice to a second inactive network slice in order to receive the available downlink data. In some embodiments, resources utilized for communications between the user equipment and the RAN, the RAN and the CN, and the CN and network functions (e.g., applications, services, etc.) are isolated between those respective network entities. It will be appreciated that such resource isolation between network entities requires minimal signal transmission for switching between disjoint and/or isolated network slices. For example, in some embodiments only an RRC is required for signaling between any two network entities (e.g., the user equipment and the RAN, etc.) and thus no resource usage is required of other network entities (e.g., the CN, etc.).

According to one aspect of the present disclosure, there is provided a method that comprises causing establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice. The method further comprises causing inactivation, via the radio access network, of the first radio resource control connection, wherein the first radio resource control connection is switched to an inactive state, wherein the inactive state is configured to at least maintain the first radio resource control context with the radio access network. The method further comprises dynamically causing re-activation, via the radio access network, of a second radio resource control connection, wherein the second radio resource control connection is switched from the inactive state to the active state or the connected state.

In some embodiments of the method, the method further comprises causing establishment, via the radio access network, of the second radio resource control connection to a second network slice, wherein the second radio resource control connection is associated with the active state or the connected state. In some embodiments of the method, the method further comprises causing inactivation, via the radio access network, of the second radio resource control connection, wherein the second radio resource control connection is switched to the inactive state. In some embodiments of the method, the method further comprises dynamically causing re-activation, via the radio access network, of the first radio resource control connection, wherein the first radio resource control connection is switched from the inactive state to the active state or the connected state.

In some embodiments of the method, the method further comprises receiving, via the radio access network which is in the active state or the connected state, a downlink data notification, wherein the downlink data notification indicates that downlink data is available from the first network slice or the second network slice via a respective radio resource control connection. In some embodiments of the method, the method further comprises causing re-activation, via the radio access network, of the respective radio resource control connection based on the downlink data notification. In some embodiments of the method, the method further comprises receiving, via the radio access network, the downlink data.

In some embodiments of the method, the method further comprises generating uplink data, wherein the uplink data indicates the first network slice or the second network slice as a recipient for the uplink data to be transmitted via a respective radio resource control connection. In some embodiments of the method, the method further comprises causing re-activation, via the radio access network, of the respective radio resource control connection based on at least the generated uplink data. In some embodiments of the method, the method further comprises causing transmission, via the radio access network, of the uplink data to the first network slice or the second network slice via the respective radio resource control connection.

In some embodiments of the method, establishing the first radio resource control connection further comprises causing transmission, via the radio access network, of a first radio resource control connection request, comprising first network slice identification data and user equipment identification data, to the first network slice, wherein the first network slice identification data comprises single network slice selection assistance information. In some embodiments of the method, establishing the first radio resource control connection further comprises receiving, via the radio access network, a first radio resource control connection response, wherein the first radio resource control connection response confirms establishment of the first radio resource control connection to the first network slice. In some embodiments of the method, establishing the first radio resource control connection further comprises causing registration, via the first radio resource control connection, with a first access and mobility management function associated with the first network slice.

In some embodiments of the method, establishing the second radio resource control connection further comprises causing transmission, via the radio access network, of a second radio resource control connection request, comprising second network slice identification data and user equipment identification data, to the second network slice, wherein the second network slice identification data comprises single network slice selection assistance information. In some embodiments of the method, establishing the second radio resource control connection further comprises receiving, via the radio access network, a second radio resource control connection response, wherein the second radio resource control connection response confirms establishment of the second radio resource control connection to the second network slice. In some embodiments of the method, establishing the second radio resource control connection further comprises causing registration, via the second radio resource control connection, with a second access and mobility management function associated with the second network slice.

In some embodiments of the method, the re-activation of an inactive radio resource control connection further comprises one or more of an inactivation or a disconnection of an active radio resource control connection. In some embodiments of the method, one or more of the first network slice or the second network slice are configured on one or more of a disjointed network or an isolated network. In some embodiments of the method, one or more networks comprising one or more of the first network slice or the second network slice further comprise one or more third network slices.

According to another aspect of the present disclosure, there is provided an apparatus that comprises at least one processor and at least one memory with the at least one memory including computer program code, that is configured to, with the at least one processor, cause the apparatus at least to cause establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice. The apparatus may be further caused to at least cause inactivation, via the radio access network, of the first radio resource control connection, wherein the first radio resource control connection is switched to an inactive state, wherein the inactive state is configured to at least maintain the first radio resource control context with the radio access network. The apparatus may be further caused to at least dynamically cause re-activation, via the radio access network, of a second radio resource control connection, wherein the second radio resource control connection is switched from the inactive state to the active state or the connected state.

In some embodiments of the apparatus, the at least one memory and the computer program code configured to, with the at least one processor, further cause the apparatus at least to cause establishment, via the radio access network, of the second radio resource control connection to a second network slice, wherein the second radio resource control connection is associated with the active state or the connected state. In some embodiments of the apparatus, the at least one memory and the computer program code configured to, with the at least one processor, further cause the apparatus at least to cause inactivation, via the radio access network, of the second radio resource control connection, wherein the second radio resource control connection is switched to the inactive state. In some embodiments of the apparatus, the at least one memory and the computer program code configured to, with the at least one processor, further cause the apparatus at least to dynamically cause re-activation, via the radio access network, of the first radio resource control connection, wherein the first radio resource control connection is switched from the inactive state to the active state or the connected state.

In some embodiments of the apparatus, the at least one memory and the computer program code configured to, with the at least one processor, further cause the apparatus at least to receive, via the radio access network which is in the active state or the connected state, a downlink data notification, wherein the downlink data notification indicates that downlink data is available from the first network slice or the second network slice via a respective radio resource control connection. In some embodiments of the apparatus, the at least one memory and the computer program code configured to, with the at least one processor, further cause the apparatus at least to cause re-activation, via the radio access network, of the respective radio resource control connection based on the downlink data notification. In some embodiments of the apparatus, the at least one memory and the computer program code configured to, with the at least one processor, further cause the apparatus at least to receive, via the radio access network, the downlink data.

In some embodiments of the apparatus, the at least one memory and the computer program code configured to, with the at least one processor, further cause the apparatus at least to generate uplink data, wherein the uplink data indicates the first network slice or the second network slice as a recipient for the uplink data to be transmitted via a respective radio resource control connection. In some embodiments of the apparatus, the at least one memory and the computer program code configured to, with the at least one processor, further cause the apparatus at least to cause re-activation, via the radio access network, of the respective radio resource control connection based on at least the generated uplink data. In some embodiments of the apparatus, the at least one memory and the computer program code configured to, with the at least one processor, further cause the apparatus at least to cause transmission, via the radio access network, of the uplink data to the first network slice or the second network slice via the respective radio resource control connection.

In some embodiments of the apparatus, establishing the first radio resource control connection further comprises causing transmission, via the radio access network, of a first radio resource control connection request, comprising first network slice identification data and user equipment identification data, to the first network slice, wherein the first network slice identification data comprises single network slice selection assistance information. In some embodiments of the apparatus, establishing the first radio resource control connection further comprises receiving, via the radio access network, a first radio resource control connection response, wherein the first radio resource control connection response confirms establishment of the first radio resource control connection to the first network slice. In some embodiments of the apparatus, establishing the first radio resource control connection further comprises causing registration, via the first radio resource control connection, with a first access and mobility management function associated with the first network slice.

In some embodiments of the apparatus, establishing the second radio resource control connection further comprises causing transmission, via the radio access network, of a second radio resource control connection request, comprising second network slice identification data and user equipment identification data, to the second network slice, wherein the second network slice identification data comprises single network slice selection assistance information. In some embodiments of the apparatus, establishing the second radio resource control connection further comprises receiving, via the radio access network, a second radio resource control connection response, wherein the second radio resource control connection response confirms establishment of the second radio resource control connection to the second network slice. In some embodiments of the apparatus, establishing the second radio resource control connection further comprises causing registration, via the second radio resource control connection, with a second access and mobility management function associated with the second network slice.

In some embodiments of the apparatus, the re-activation of an inactive radio resource control connection further comprises one or more of an inactivation or a disconnection of an active radio resource control connection. In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices.

According to another aspect of the present disclosure, there is provided a computer program product that comprises at least a non-transitory computer readable storage medium having program code portions stored thereon with the program code portions being configured, upon execution, to cause establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice. The computer program product may be further configured, upon execution, to at least cause inactivation, via the radio access network, of the first radio resource control connection, wherein the first radio resource control connection is switched to an inactive state, wherein the inactive state is configured to at least maintain the first radio resource control context with the radio access network. The computer program product may be further configured, upon execution, to at least dynamically cause re-activation, via the radio access network, of a second radio resource control connection, wherein the second radio resource control connection is switched from the inactive state to the active state or the connected state.

In some embodiments of the computer program product, the program code portions are further configured, upon execution, to cause establishment, via the radio access network, of the second radio resource control connection to a second network slice, wherein the second radio resource control connection is associated with the active state or the connected state. In some embodiments of the computer program product, the program code portions are further configured, upon execution, to cause inactivation, via the radio access network, of the second radio resource control connection, wherein the second radio resource control connection is switched to the inactive state. In some embodiments of the computer program product, the program code portions are further configured, upon execution, to dynamically causing re-activation, via the radio access network, of the first radio resource control connection, wherein the first radio resource control connection is switched from the inactive state to the active state or the connected state.

In some embodiments of the computer program product, the program code portions are further configured, upon execution, to receive, via the radio access network which is in the active state or the connected state, a downlink data notification, wherein the downlink data notification indicates that downlink data is available from the first network slice or the second network slice via a respective radio resource control connection. In some embodiments of the computer program product, the program code portions are further configured, upon execution, to cause re-activation, via the radio access network, of the respective radio resource control connection based on the downlink data notification. In some embodiments of the computer program product, the program code portions are further configured, upon execution, to receive, via the radio access network, the downlink data.

In some embodiments of the computer program product, the program code portions are further configured, upon execution, to generate uplink data, wherein the uplink data indicates the first network slice or the second network slice as a recipient for the uplink data to be transmitted via a respective radio resource control connection. In some embodiments of the computer program product, the program code portions are further configured, upon execution, to cause re-activation, via the radio access network, of the respective radio resource control connection based on at least the generated uplink data. In some embodiments of the computer program product, the program code portions are further configured, upon execution, to cause transmission, via the radio access network, of the uplink data to the first network slice or the second network slice via the respective radio resource control connection.

In some embodiments of the computer program product, establishing the first radio resource control connection further comprises causing transmission, via the radio access network, of a first radio resource control connection request, comprising first network slice identification data and user equipment identification data, to the first network slice, wherein the first network slice identification data comprises single network slice selection assistance information. In some embodiments of the computer program product, establishing the first radio resource control connection further comprises receiving, via the radio access network, a first radio resource control connection response, wherein the first radio resource control connection response confirms establishment of the first radio resource control connection to the first network slice. In some embodiments of the computer program product, establishing the first radio resource control connection further comprises causing registration, via the first radio resource control connection, with a first access and mobility management function associated with the first network slice.

In some embodiments of the computer program product, establishing the second radio resource control connection further comprises causing transmission, via the radio access network, of a second radio resource control connection request, comprising second network slice identification data and user equipment identification data, to the second network slice, wherein the second network slice identification data comprises single network slice selection assistance information. In some embodiments of the computer program product, establishing the second radio resource control connection further comprises receiving, via the radio access network, a second radio resource control connection response, wherein the second radio resource control connection response confirms establishment of the second radio resource control connection to the second network slice. In some embodiments of the computer program product, establishing the second radio resource control connection further comprises causing registration, via the second radio resource control connection, with a second access and mobility management function associated with the second network slice.

In some embodiments of the computer program product, the re-activation of an inactive radio resource control connection further comprises one or more of an inactivation or a disconnection of an active radio resource control connection. In some embodiments of the computer program product, one or more of the first network slice or the second network slice are configured on one or more of a disjointed network or an isolated network. In some embodiments of the computer program product, one or more networks comprising one or more of the first network slice or the second network slice further comprise one or more third network slices.

According to another aspect of the present disclosure, there is provided an apparatus that comprises means for causing establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice. The apparatus further comprises means for causing inactivation, via the radio access network, of the first radio resource control connection, wherein the first radio resource control connection is switched to an inactive state, wherein the inactive state is configured to at least maintain the first radio resource control context with the radio access network. The apparatus further comprises means for dynamically causing re-activation, via the radio access network, of a second radio resource control connection, wherein the second radio resource control connection is switched from the inactive state to the active state or the connected state.

In some embodiments the apparatus further comprises means for causing establishment, via the radio access network, of the second radio resource control connection to a second network slice, wherein the second radio resource control connection is associated with the active state or the connected state. In some embodiments the apparatus further comprises means for causing inactivation, via the radio access network, of the second radio resource control connection, wherein the second radio resource control connection is switched to the inactive state. In some embodiments the apparatus further comprises means for dynamically causing re-activation, via the radio access network, of the first radio resource control connection, wherein the first radio resource control connection is switched from the inactive state to the active state or the connected state.

In some embodiments the apparatus further comprises means for receiving, via the radio access network which is in the active state or the connected state, a downlink data notification, wherein the downlink data notification indicates that downlink data is available from the first network slice or the second network slice via a respective radio resource control connection. In some embodiments the apparatus further comprises means for causing re-activation, via the radio access network, of the respective radio resource control connection based on the downlink data notification. In some embodiments the apparatus further comprises means for receiving, via the radio access network, the downlink data.

In some embodiments the apparatus further comprises means for generating uplink data, wherein the uplink data indicates the first network slice or the second network slice as a recipient for the uplink data to be transmitted via a respective radio resource control connection. In some embodiments the apparatus further comprises means for causing re-activation, via the radio access network, of the respective radio resource control connection based on at least the generated uplink data. In some embodiments the apparatus further comprises means for causing transmission, via the radio access network, of the uplink data to the first network slice or the second network slice via the respective radio resource control connection.

In some embodiments the apparatus further comprises means for causing transmission, via the radio access network, of a first radio resource control connection request, comprising first network slice identification data and user equipment identification data, to the first network slice, wherein the first network slice identification data comprises single network slice selection assistance information. In some embodiments the apparatus further comprises means for receiving, via the radio access network, a first radio resource control connection response, wherein the first radio resource control connection response confirms establishment of the first radio resource control connection to the first network slice. In some embodiments the apparatus further comprises means for causing registration, via the first radio resource control connection, with a first access and mobility management function associated with the first network slice.

In some embodiments the apparatus further comprises means for causing transmission, via the radio access network, of a second radio resource control connection request, comprising second network slice identification data and user equipment identification data, to the second network slice, wherein the second network slice identification data comprises single network slice selection assistance information. In some embodiments the apparatus further comprises means for receiving, via the radio access network, a second radio resource control connection response, wherein the second radio resource control connection response confirms establishment of the second radio resource control connection to the second network slice. In some embodiments the apparatus further comprises means for causing registration, via the second radio resource control connection, with a second access and mobility management function associated with the second network slice.

In some embodiments of the apparatus, the re-activation of an inactive radio resource control connection further comprises one or more of an inactivation or a disconnection of an active radio resource control connection. In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices.

According to one aspect of the present disclosure, there is provided a method that comprises establishing a first radio resource control connection between a user equipment and a first network slice, wherein the first radio resource control connection is associated with an active state or a connected state, wherein the active state or the connected state is configured to at least maintain a registration, and allow for communication transmissions, between the user equipment and a respective network slice. The method further comprises inactivating the first radio resource control connection, wherein the first radio resource control connection is switched to an inactive state, wherein the inactive state is configured to at least suspend a radio resource control connection between the user equipment and the radio access network while a context for the suspended radio resource control connection is retained, and a corresponding connection between a core network and the radio access network remains in the active state or connected state. The method further comprises re-activating a second radio resource control connection, wherein the second radio resource control connection is switched from the inactive state to the active state or the connected state.

In some embodiments the method further comprises establishing the second radio resource control connection between the user equipment and a second network slice, wherein the second radio resource control connection is associated with the active state or the connected state. In some embodiments the method further comprises inactivating the second radio resource control connection, wherein the second radio resource control connection is switched to the inactive state. In some embodiments the method further comprises re-activating the first radio resource control connection wherein the first radio resource control connection is switched from the inactive state to the active state or the connected state.

In some embodiments the method further comprises receiving, from the user equipment, the first radio resource control connection request comprising first network slice identification data and user equipment identification data, wherein the first network slice identification data comprises single network slice selection assistance information. In some embodiments the method further comprises causing transmission, to a first access and mobility management function based on at least the first network slice identification data, of the first radio resource control connection request. In some embodiments the method further comprises receiving, from the first network slice, first downlink data comprising an indication of the user equipment identification data. In some embodiments the method further comprises causing transmission, to the user equipment via the second radio resource control connection in the active state or connected state, of a first downlink data notification, wherein the first downlink data notification indicates that the first downlink data is available from the first network slice over the first radio resource control connection in the inactive state.

In some embodiments the method further comprises receiving, from the user equipment, a second radio resource control connection request comprising second network slice identification data and the user equipment identification data, wherein the second network slice identification data comprises another single network slice selection assistance information. In some embodiments the method further comprises causing transmission, to a second access and mobility management function based on at least the second network slice identification data, of the second radio resource control connection request. In some embodiments the method further comprises receiving, from a second network slice, second downlink data comprising an indication of the user equipment identification data. In some embodiments the method further comprises causing transmission, to the user equipment via the first radio resource control connection in the active state or connected state, of a second downlink data notification, wherein the second downlink data notification indicates that the second downlink data is available from the second network slice over the second radio resource control connection in the inactive state.

In some embodiments of the method, one or more of the first network slice or the second network slice are configured on one or more of a disjointed network or an isolated network. In some embodiments of the method, one or more networks comprising one or more of the first network slice or the second network slice further comprise one or more third network slices. In some embodiments of the method, in an instance that the first radio resource control connection and the second radio resource control connection are in the inactive state or an idle state then the radio access network at least partially causes transmission of a respective downlink data notification via paging procedures, wherein the paging procedures comprise causing transmission of a paging message to the user equipment that indicates a respective network slice, wherein the paging message is generated by the radio access network or a respective access and mobility management function. In some embodiments of the method, the first radio resource control connection and the second radio resource control connection are dynamically switched between the active state or the connected state and the inactive state.

In some embodiments of the method, in an instance at least one radio resource control connection is in one or more of a connected state or the active state, the at least one radio resource control connection provides an indication to stop periodic radio access network notification update procedures from being triggered to transmit to the user equipment. In some embodiments of the method, in an instance all radio resource control connections are moved to the inactive state, the radio access network indicates a radio access network notification update procedure timer during a last radio resource control release.

According to another aspect of the present disclosure, there is provided an apparatus that comprises at least one processor and at least one memory with the at least one memory including computer program code, that is configured to, with the at least one processor, cause the apparatus at least to establish a first radio resource control connection between a user equipment and a first network slice, wherein the first radio resource control connection is associated with an active state or a connected state, wherein the active state or the connected state is configured to at least maintain a registration, and allow for communication transmissions, between the user equipment and a respective network slice. The apparatus may be further caused to at least inactivate the first radio resource control connection, wherein the first radio resource control connection is switched to an inactive state, wherein the inactive state is configured to at least suspend a radio resource control connection between the user equipment and the radio access network while a context for the suspended radio resource control connection is retained, and a corresponding connection between a core network and the radio access network remains in the active state or connected state. The apparatus may be further caused to at least re-activate a second radio resource control connection, wherein the second radio resource control connection is switched from the inactive state to the active state or the connected state.

In some embodiments of the apparatus, the at least one memory and the computer program code configured to, with the at least one processor, further cause the apparatus at least to establish the second radio resource control connection between the user equipment and a second network slice, wherein the second radio resource control connection is associated with the active state or the connected state. In some embodiments of the apparatus, the at least one memory and the computer program code configured to, with the at least one processor, further cause the apparatus at least to inactivate the second radio resource control connection, wherein the second radio resource control connection is switched to the inactive state. In some embodiments of the apparatus, the at least one memory and the computer program code configured to, with the at least one processor, further cause the apparatus at least to re-activate the first radio resource control connection wherein the first radio resource control connection is switched from the inactive state to the active state or the connected state.

In some embodiments of the apparatus, the at least one memory and the computer program code configured to, with the at least one processor, further cause the apparatus at least to receive, from the user equipment, the first radio resource control connection request comprising first network slice identification data and user equipment identification data, wherein the first network slice identification data comprises single network slice selection assistance information. In some embodiments of the apparatus, the at least one memory and the computer program code configured to, with the at least one processor, further cause the apparatus at least to cause transmission, to a first access and mobility management function based on at least the first network slice identification data, of the first radio resource control connection request. In some embodiments of the apparatus, the at least one memory and the computer program code configured to, with the at least one processor, further cause the apparatus at least to receive, from the first network slice, first downlink data comprising an indication of the user equipment identification data. In some embodiments of the apparatus, the at least one memory and the computer program code configured to, with the at least one processor, further cause the apparatus at least to cause transmission, to the user equipment via the second radio resource control connection in the active state or connected state, of a first downlink data notification, wherein the first downlink data notification indicates that the first downlink data is available from the first network slice over the first radio resource control connection in the inactive state.

In some embodiments of the apparatus, the at least one memory and the computer program code configured to, with the at least one processor, further cause the apparatus at least to receive, from the user equipment, a second radio resource control connection request comprising second network slice identification data and the user equipment identification data, wherein the second network slice identification data comprises another single network slice selection assistance information. In some embodiments of the apparatus, the at least one memory and the computer program code configured to, with the at least one processor, further cause the apparatus at least to cause transmission, to a second access and mobility management function based on at least the second network slice identification data, of the second radio resource control connection request. In some embodiments of the apparatus, the at least one memory and the computer program code configured to, with the at least one processor, further cause the apparatus at least to receive, from a second network slice, second downlink data comprising an indication of the user equipment identification data. In some embodiments of the apparatus, the at least one memory and the computer program code configured to, with the at least one processor, further cause the apparatus at least to cause transmission, to the user equipment via the first radio resource control connection in the active state or connected state, of a second downlink data notification, wherein the second downlink data notification indicates that the second downlink data is available from the second network slice over the second radio resource control connection in the inactive state.

In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices. In some embodiments of the apparatus, in an instance that the first radio resource control connection and the second radio resource control connection are in the inactive state or an idle state then the radio access network at least partially causes transmission of a respective downlink data notification via paging procedures, wherein the paging procedures comprise causing transmission of a paging message to the user equipment that indicates a respective network slice, wherein the paging message is generated by the radio access network or a respective access and mobility management function. In some embodiments of the apparatus, the first radio resource control connection and the second radio resource control connection are dynamically switched between the active state or the connected state and the inactive state.

In some embodiments of the apparatus, in an instance at least one radio resource control connection is in one or more of a connected state or the active state, the at least one radio resource control connection provides an indication to stop periodic radio access network notification update procedures from being triggered to transmit to the user equipment. In some embodiments of the apparatus, in an instance all radio resource control connections are moved to the inactive state, the radio access network indicates a radio access network notification update procedure timer during a last radio resource control release.

According to another aspect of the present disclosure, there is provided a computer program product that comprises at least a non-transitory computer readable storage medium having program code portions stored thereon with the program code portions being configured, upon execution, to establish a first radio resource control connection between a user equipment and a first network slice, wherein the first radio resource control connection is associated with an active state or a connected state, wherein the active state or the connected state is configured to at least maintain a registration, and allow for communication transmissions, between the user equipment and a respective network slice.

The computer program product may be further configured, upon execution, to at least inactivate the first radio resource control connection, wherein the first radio resource control connection is switched to an inactive state, wherein the inactive state is configured to at least suspend a radio resource control connection between the user equipment and the radio access network while a context for the suspended radio resource control connection is retained, and a corresponding connection between a core network and the radio access network remains in the active state or connected state. The computer program product may be further configured, upon execution, to at least re-activate a second radio resource control connection, wherein the second radio resource control connection is switched from the inactive state to the active state or the connected state.

In some embodiments of the computer program product, the program code portions are further configured, upon execution, to establish the second radio resource control connection between the user equipment and a second network slice, wherein the second radio resource control connection is associated with the active state or the connected state. In some embodiments of the computer program product, the program code portions are further configured, upon execution, to inactivate the second radio resource control connection, wherein the second radio resource control connection is switched to the inactive state. In some embodiments of the computer program product, the program code portions are further configured, upon execution, to re-activate the first radio resource control connection wherein the first radio resource control connection is switched from the inactive state to the active state or the connected state.

In some embodiments of the computer program product, the program code portions are further configured, upon execution, to receive, from the user equipment, the first radio resource control connection request comprising first network slice identification data and user equipment identification data, wherein the first network slice identification data comprises single network slice selection assistance information. In some embodiments of the computer program product, the program code portions are further configured, upon execution, to cause transmission, to a first access and mobility management function based on at least the first network slice identification data, of the first radio resource control connection request. In some embodiments of the computer program product, the program code portions are further configured, upon execution, to receive, from the first network slice, first downlink data comprising an indication of the user equipment identification data. In some embodiments of the computer program product, the program code portions are further configured, upon execution, to cause transmission, to the user equipment via the second radio resource control connection in the active state or connected state, of a first downlink data notification, wherein the first downlink data notification indicates that the first downlink data is available from the first network slice over the first radio resource control connection in the inactive state.

In some embodiments of the computer program product, the program code portions are further configured, upon execution, to receive, from the user equipment, a second radio resource control connection request comprising second network slice identification data and the user equipment identification data, wherein the second network slice identification data comprises another single network slice selection assistance information. In some embodiments of the computer program product, the program code portions are further configured, upon execution, to cause transmission, to a second access and mobility management function based on at least the second network slice identification data, of the second radio resource control connection request. In some embodiments of the computer program product, the program code portions are further configured, upon execution, to receive, from a second network slice, second downlink data comprising an indication of the user equipment identification data. In some embodiments of the computer program product, the program code portions are further configured, upon execution, to cause transmission, to the user equipment via the first radio resource control connection in the active state or connected state, of a second downlink data notification, wherein the second downlink data notification indicates that the second downlink data is available from the second network slice over the second radio resource control connection in the inactive state.

In some embodiments of the computer program product, one or more of the first network slice or the second network slice are configured on one or more of a disjointed network or an isolated network. In some embodiments of the computer program product, one or more networks comprising one or more of the first network slice or the second network slice further comprise one or more third network slices. In some embodiments of the computer program product, in an instance that the first radio resource control connection and the second radio resource control connection are in the inactive state or an idle state then the radio access network at least partially causes transmission of a respective downlink data notification via paging procedures, wherein the paging procedures comprise causing transmission of a paging message to the user equipment that indicates a respective network slice, wherein the paging message is generated by the radio access network or a respective access and mobility management function. In some embodiments of the computer program product, the first radio resource control connection and the second radio resource control connection are dynamically switched between the active state or the connected state and the inactive state.

In some embodiments of the computer program product, in an instance at least one radio resource control connection is in one or more of a connected state or the active state, the at least one radio resource control connection provides an indication to stop periodic radio access network notification update procedures from being triggered to transmit to the user equipment. In some embodiments of the computer program product, in an instance all radio resource control connections are moved to the inactive state, the radio access network indicates a radio access network notification update procedure timer during a last radio resource control release.

According to another aspect of the present disclosure, there is provided an apparatus that comprises means for establishing a first radio resource control connection between a user equipment and a first network slice, wherein the first radio resource control connection is associated with an active state or a connected state, wherein the active state or the connected state is configured to at least maintain a registration, and allow for communication transmissions, between the user equipment and a respective network slice. The method further comprises means for inactivating the first radio resource control connection, wherein the first radio resource control connection is switched to an inactive state, wherein the inactive state is configured to at least suspend a radio resource control connection between the user equipment and the radio access network while a context for the suspended radio resource control connection is retained, and a corresponding connection between a core network and the radio access network remains in the active state or connected state. The method further comprises means for re-activating a second radio resource control connection, wherein the second radio resource control connection is switched from the inactive state to the active state or the connected state.

In some embodiments the apparatus further comprises means for establishing the second radio resource control connection between the user equipment and a second network slice, wherein the second radio resource control connection is associated with the active state or the connected state. In some embodiments the apparatus further comprises means for inactivating the second radio resource control connection, wherein the second radio resource control connection is switched to the inactive state. In some embodiments the apparatus further comprises means for re-activating the first radio resource control connection wherein the first radio resource control connection is switched from the inactive state to the active state or the connected state.

In some embodiments the apparatus further comprises means for receiving, from the user equipment, the first radio resource control connection request comprising first network slice identification data and user equipment identification data, wherein the first network slice identification data comprises single network slice selection assistance information. In some embodiments the apparatus further comprises means for causing transmission, to a first access and mobility management function based on at least the first network slice identification data, of the first radio resource control connection request. In some embodiments the apparatus further comprises means for receiving, from the first network slice, first downlink data comprising an indication of the user equipment identification data. In some embodiments the apparatus further comprises means for causing transmission, to the user equipment via the second radio resource control connection in the active state or connected state, of a first downlink data notification, wherein the first downlink data notification indicates that the first downlink data is available from the first network slice over the first radio resource control connection in the inactive state.

In some embodiments the apparatus further comprises means for receiving, from the user equipment, a second radio resource control connection request comprising second network slice identification data and the user equipment identification data, wherein the second network slice identification data comprises another single network slice selection assistance information. In some embodiments the apparatus further comprises means for causing transmission, to a second access and mobility management function based on at least the second network slice identification data, of the second radio resource control connection request. In some embodiments the apparatus further comprises means for receiving, from a second network slice, second downlink data comprising an indication of the user equipment identification data. In some embodiments the apparatus further comprises means for causing transmission, to the user equipment via the first radio resource control connection in the active state or connected state, of a second downlink data notification, wherein the second downlink data notification indicates that the second downlink data is available from the second network slice over the second radio resource control connection in the inactive state.

In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices. In some embodiments of the apparatus, in an instance that the first radio resource control connection and the second radio resource control connection are in the inactive state or an idle state then the radio access network at least partially causes transmission of a respective downlink data notification via paging procedures, wherein the paging procedures comprise causing transmission of a paging message to the user equipment that indicates a respective network slice, wherein the paging message is generated by the radio access network or a respective access and mobility management function. In some embodiments of the apparatus, the first radio resource control connection and the second radio resource control connection are dynamically switched between the active state or the connected state and the inactive state.

In some embodiments of the apparatus, in an instance at least one radio resource control connection is in one or more of a connected state or the active state, the at least one radio resource control connection provides an indication to stop periodic radio access network notification update procedures from being triggered to transmit to the user equipment. In some embodiments of the apparatus, in an instance all radio resource control connections are moved to the inactive state, the radio access network indicates a radio access network notification update procedure timer during a last radio resource control release.

According to one aspect of the present disclosure, there is provided a method that comprises receiving, from a first access and mobility management function, first registration information associated with at least user equipment identification data and first network slice information. The method further comprises updating, based on the first registration information, a user equipment state to include at least the first network slice information. The method further comprises receiving, from a second access and mobility management function, second registration information associated with at least the user equipment identification data and second network slice information. The method further comprises updating, based on the second registration information, the user equipment state to include at least the second network slice information.

In some embodiments of the method, the first access and mobility management function is associated with a first network slice, and wherein the second access and mobility management function is associated with a second network slice. In some embodiments of the method, one or more of the first network slice or the second network slice are configured on one or more of a disjointed network or an isolated network. In some embodiments of the method, one or more networks comprising one or more of the first network slice or the second network slice further comprise one or more third network slices. In some embodiments of the method, the first radio resource control connection, the second radio resource control connection, and one or more third radio resource control connections are maintained between the user equipment and a plurality of respective network slices simultaneously, and at least one radio resource control connection is in the active state or the connected state.

According to another aspect of the present disclosure, there is provided an apparatus that comprises at least one processor and at least one memory with the at least one memory including computer program code, that is configured to, with the at least one processor, cause the apparatus at least to receive, from a first access and mobility management function, first registration information associated with at least user equipment identification data and first network slice information. The apparatus may be further caused to at least update, based on the first registration information, a user equipment state to include at least the first network slice information. The apparatus may be further caused to at least receive, from a second access and mobility management function, second registration information associated with at least the user equipment identification data and second network slice information. The apparatus may be further caused to at least update, based on the second registration information, the user equipment state to include at least the second network slice information.

In some embodiments of the apparatus, the first access and mobility management function is associated with a first network slice, and wherein the second access and mobility management function is associated with a second network slice. In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices. In some embodiments of the apparatus, the first radio resource control connection, the second radio resource control connection, and one or more third radio resource control connections are maintained between the user equipment and a plurality of respective network slices simultaneously, and at least one radio resource control connection is in the active state or the connected state.

According to another aspect of the present disclosure, there is provided a computer program product that comprises at least a non-transitory computer readable storage medium having program code portions stored thereon with the program code portions being configured, upon execution, to receive, from a first access and mobility management function, first registration information associated with at least user equipment identification data and first network slice information. The computer program product may be further configured, upon execution, to at least update, based on the first registration information, a user equipment state to include at least the first network slice information. The computer program product may be further configured, upon execution, to at least receive, from a second access and mobility management function, second registration information associated with at least the user equipment identification data and second network slice information. The computer program product may be further configured, upon execution, to at least update, based on the second registration information, the user equipment state to include at least the second network slice information.

In some embodiments of the computer program product, the first access and mobility management function is associated with a first network slice, and wherein the second access and mobility management function is associated with a second network slice. In some embodiments of the computer program product, one or more of the first network slice or the second network slice are configured on one or more of a disjointed network or an isolated network. In some embodiments of the computer program product, one or more networks comprising one or more of the first network slice or the second network slice further comprise one or more third network slices. In some embodiments of the computer program product, the first radio resource control connection, the second radio resource control connection, and one or more third radio resource control connections are maintained between the user equipment and a plurality of respective network slices simultaneously, and at least one radio resource control connection is in the active state or the connected state.

According to another aspect of the present disclosure, there is provided an apparatus that comprises means for receiving, from a first access and mobility management function, first registration information associated with at least user equipment identification data and first network slice information. The apparatus further comprises means for updating, based on the first registration information, a user equipment state to include at least the first network slice information. The apparatus further comprises means for receiving, from a second access and mobility management function, second registration information associated with at least the user equipment identification data and second network slice information. The apparatus further comprises means for updating, based on the second registration information, the user equipment state to include at least the second network slice information.

In some embodiments of the apparatus, the first access and mobility management function is associated with a first network slice, and wherein the second access and mobility management function is associated with a second network slice. In some embodiments of the apparatus, one or more of the first network slice or the second network slice are configured on one or more of a disjointed network or an isolated network. In some embodiments of the apparatus, one or more networks comprising one or more of the first network slice or the second network slice further comprise one or more third network slices. In some embodiments of the apparatus, the first radio resource control connection, the second radio resource control connection, and one or more third radio resource control connections are maintained between the user equipment and a plurality of respective network slices simultaneously, and at least one radio resource control connection is in the active state or the connected state.

According to one aspect of the present disclosure, there is provided a method that comprises maintaining, via a first access and mobility management function, a first registration state associated with at least a user equipment and a first network slice. The method further comprises maintaining, via a second access and mobility management function, a second registration state associated with at least the user equipment and a second network slice, wherein the first registration state and the second registration state are simultaneously maintained on a public land mobile network comprising a radio access network.

In some embodiments the method further comprises maintaining, via one or more additional access and mobility management functions, one or more additional registration states associated with at least the user equipment and a respective network slice, wherein the one or more additional registration states are simultaneously maintained on the public land mobile network with at least the first registration state and the second registration state.

In some embodiments of the method, the first access and mobility management function is associated with the first network slice, the second access and mobility management function is associated with the second network slice, and the one or more additional access and mobility management functions are associated with a respective additional network slice. In some embodiments of the method, at least the first network slice and the second network slice are disjoint or isolated and cannot be provided by a single access and mobility management function.

In some embodiments the method further comprises generating, via the first access and mobility management function, a first paging message comprising a first downlink data notification that indicates the first network slice. In some embodiments the method further comprises causing transmission, via the radio access network, of the first paging message to the user equipment. In some embodiments the method further comprises causing transmission, via the radio access network, of a first downlink data message to the user equipment.

In some embodiments the method further comprises generating, via the second access and mobility management function, a second paging message comprising a second downlink data notification that indicates the second network slice. In some embodiments the method further comprises causing transmission, via the radio access network, of the second paging message to the user equipment. In some embodiments the method further comprises causing transmission, via the radio access network, of a second downlink data message to the user equipment.

According to another aspect of the present disclosure, there is provided an apparatus that comprises at least one processor and at least one memory with the at least one memory including computer program code, that is configured to, with the at least one processor, cause the apparatus at least to maintain, via a first access and mobility management function, a first registration state associated with at least a user equipment and a first network slice. The apparatus may be further caused to at least maintain, via a second access and mobility management function, a second registration state associated with at least the user equipment and a second network slice wherein the first registration state and the second registration state are simultaneously maintained on a public land mobile network comprising a radio access network.

In some embodiments of the apparatus, the at least one memory and the computer program code configured to, with the at least one processor, further cause the apparatus at least to maintain, via one or more additional access and mobility management functions, one or more additional registration states associated with at least the user equipment and a respective network slice, wherein the one or more additional registration states are simultaneously maintained on the public land mobile network with at least the first registration state and the second registration state.

In some embodiments of the apparatus, the first access and mobility management function is associated with the first network slice, the second access and mobility management function is associated with the second network slice, and the one or more additional access and mobility management functions are associated with a respective additional network slice. In some embodiments of the apparatus, at least the first network slice and the second network slice are disjoint or isolated and cannot be provided by a single access and mobility management function.

In some embodiments of the apparatus, the at least one memory and the computer program code configured to, with the at least one processor, further cause the apparatus at least to generate, via the first access and mobility management function, a first paging message comprising a first downlink data notification that indicates the first network slice. In some embodiments of the apparatus, the at least one memory and the computer program code configured to, with the at least one processor, further cause the apparatus at least to cause transmission, via the radio access network, of the first paging message to the user equipment. In some embodiments of the apparatus, the at least one memory and the computer program code configured to, with the at least one processor, further cause the apparatus at least to cause transmission, via the radio access network, of a first downlink data message to the user equipment.

In some embodiments of the apparatus, the at least one memory and the computer program code configured to, with the at least one processor, further cause the apparatus at least to generate, via the second access and mobility management function, a second paging message comprising a second downlink data notification that indicates the second network slice. In some embodiments of the apparatus, the at least one memory and the computer program code configured to, with the at least one processor, further cause the apparatus at least to cause transmission, via the radio access network, of the second paging message to the user equipment. In some embodiments of the apparatus, the at least one memory and the computer program code configured to, with the at least one processor, further cause the apparatus at least to cause transmission, via the radio access network, of a second downlink data message to the user equipment.

According to another aspect of the present disclosure, there is provided a computer program product that comprises at least a non-transitory computer readable storage medium having program code portions stored thereon with the program code portions being configured, upon execution, to maintain, via a first access and mobility management function, a first registration state associated with at least a user equipment and a first network slice. The computer program product may be further configured, upon execution, to at least maintain, via a second access and mobility management function, a second registration state associated with at least the user equipment and a second network slice, wherein the first registration state and the second registration state are simultaneously maintained on a public land mobile network comprising a radio access network.

In some embodiments of the computer program product, the program code portions are further configured, upon execution, to maintain, via one or more additional access and mobility management functions, one or more additional registration states associated with at least the user equipment and a respective network slice, wherein the one or more additional registration states are simultaneously maintained on the public land mobile network with at least the first registration state and the second registration state.

In some embodiments of the computer program product, the first access and mobility management function is associated with the first network slice, the second access and mobility management function is associated with the second network slice, and the one or more additional access and mobility management functions are associated with a respective additional network slice. In some embodiments of the computer program product, at least the first network slice and the second network slice are disjoint or isolated and cannot be provided by a single access and mobility management function.

In some embodiments of the computer program product, the program code portions are further configured, upon execution, to generate, via the first access and mobility management function, a first paging message comprising a first downlink data notification that indicates the first network slice. In some embodiments of the computer program product, the program code portions are further configured, upon execution, to cause transmission, via the radio access network, of the first paging message to the user equipment. In some embodiments of the computer program product, the program code portions are further configured, upon execution, to cause transmission, via the radio access network, of a first downlink data message to the user equipment.

In some embodiments of the computer program product, the program code portions are further configured, upon execution, to generate, via the second access and mobility management function, a second paging message comprising a second downlink data notification that indicates the second network slice. In some embodiments of the computer program product, the program code portions are further configured, upon execution, to cause transmission, via the radio access network, of the second paging message to the user equipment. In some embodiments of the computer program product, the program code portions are further configured, upon execution, to cause transmission, via the radio access network, of a second downlink data message to the user equipment.

According to another aspect of the present disclosure, there is provided an apparatus that comprises means for maintaining, via a first access and mobility management function, a first registration state associated with at least a user equipment and a first network slice. The apparatus further comprises means for maintaining, via a second access and mobility management function, a second registration state associated with at least the user equipment and a second network slice, wherein the first registration state and the second registration state are simultaneously maintained on a public land mobile network comprising a radio access network.

In some embodiments the apparatus further comprises means for maintaining, via one or more additional access and mobility management functions, one or more additional registration states associated with at least the user equipment and a respective network slice, wherein the one or more additional registration states are simultaneously maintained on the public land mobile network with at least the first registration state and the second registration state.

In some embodiments of the apparatus, the first access and mobility management function is associated with the first network slice, the second access and mobility management function is associated with the second network slice, and the one or more additional access and mobility management functions are associated with a respective additional network slice. In some embodiments of the apparatus, at least the first network slice and the second network slice are disjoint or isolated and cannot be provided by a single access and mobility management function.

In some embodiments the apparatus further comprises means for generating, via the first access and mobility management function, a first paging message comprising a first downlink data notification that indicates the first network slice. In some embodiments the apparatus further comprises means for causing transmission, via the radio access network, of the first paging message to the user equipment. In some embodiments the apparatus further comprises means for causing transmission, via the radio access network, of a first downlink data message to the user equipment.

In some embodiments the apparatus further comprises means for generating, via the second access and mobility management function, a second paging message comprising a second downlink data notification that indicates the second network slice. In some embodiments the apparatus further comprises means for causing transmission, via the radio access network, of the second paging message to the user equipment. In some embodiments the apparatus further comprises means for causing transmission, via the radio access network, of a second downlink data message to the user equipment.

According to one aspect of the present disclosure, there is provided a method that comprises receiving, from a network slice subnet management function, network slice information for one or more network slices. The method further comprises generating a rejected single network slice selection assistance information list based on the received network slice information, wherein the rejected single network slice selection assistance information list indicates at least one network slice of the one or more network slices that requires a respective radio resource control connection. The method further comprises causing transmission, via a radio access network, of a registration accept message comprising the rejected single network slice selection assistance information list to a user equipment.

According to another aspect of the present disclosure, there is provided an apparatus that comprises at least one processor and at least one memory with the at least one memory including computer program code, that is configured to, with the at least one processor, cause the apparatus at least to receive, from a network slice subnet management function, network slice information for one or more network slices. The apparatus may be further caused to at least generate a rejected single network slice selection assistance information list based on the received network slice information, wherein the rejected single network slice selection assistance information list indicates at least one network slice of the one or more network slices that requires a respective radio resource control connection. The apparatus may be further caused to at least cause transmission, via a radio access network, of a registration accept message comprising the rejected single network slice selection assistance information list to a user equipment.

According to another aspect of the present disclosure, there is provided a computer program product that comprises at least a non-transitory computer readable storage medium having program code portions stored thereon with the program code portions being configured, upon execution, to receive, from a network slice subnet management function, network slice information for one or more network slices. The computer program product may be further configured, upon execution, to at least generate a rejected single network slice selection assistance information list based on the received network slice information, wherein the rejected single network slice selection assistance information list indicates at least one network slice of the one or more network slices that requires a respective radio resource control connection. The computer program product may be further configured, upon execution, to at least cause transmission, via a radio access network, of a registration accept message comprising the rejected single network slice selection assistance information list to a user equipment.

According to another aspect of the present disclosure, there is provided an apparatus that comprises means for receiving, from a network slice subnet management function, network slice information for one or more network slices. The apparatus further comprises means for generating a rejected single network slice selection assistance information list based on the received network slice information, wherein the rejected single network slice selection assistance information list indicates at least one network slice of the one or more network slices that requires a respective radio resource control connection. The apparatus further comprises means for causing transmission, via a radio access network, of a registration accept message comprising the rejected single network slice selection assistance information list to a user equipment.

Various other aspects are also described in the following detailed description and in the attached claims.

BRIEF DESCRIPTION OF THE DRAWINGS

Figure 1:
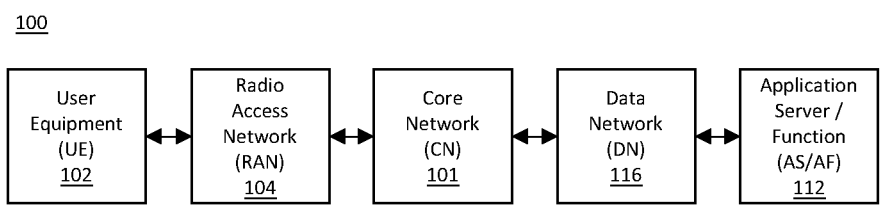
Figure 2:
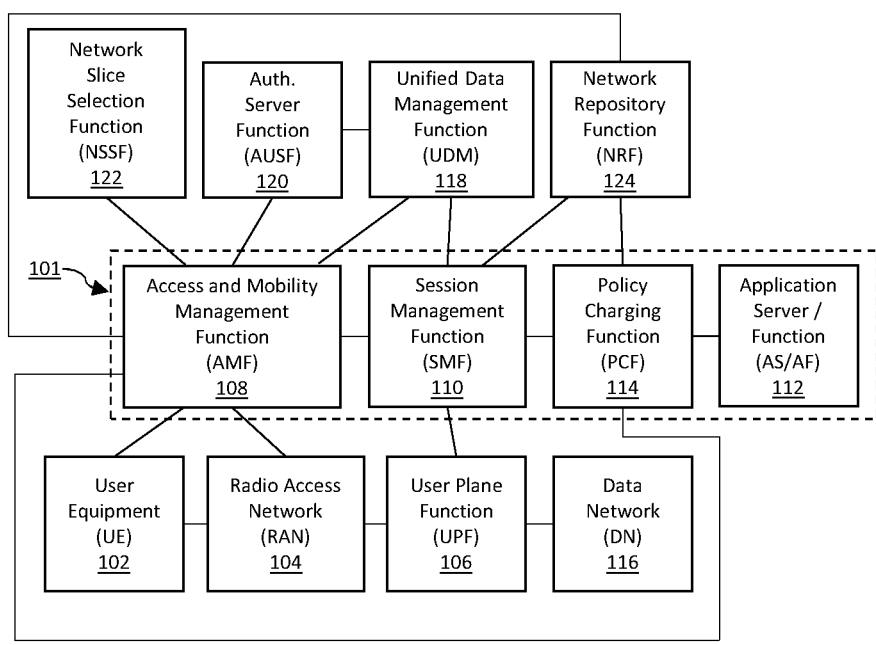
Figure 3:
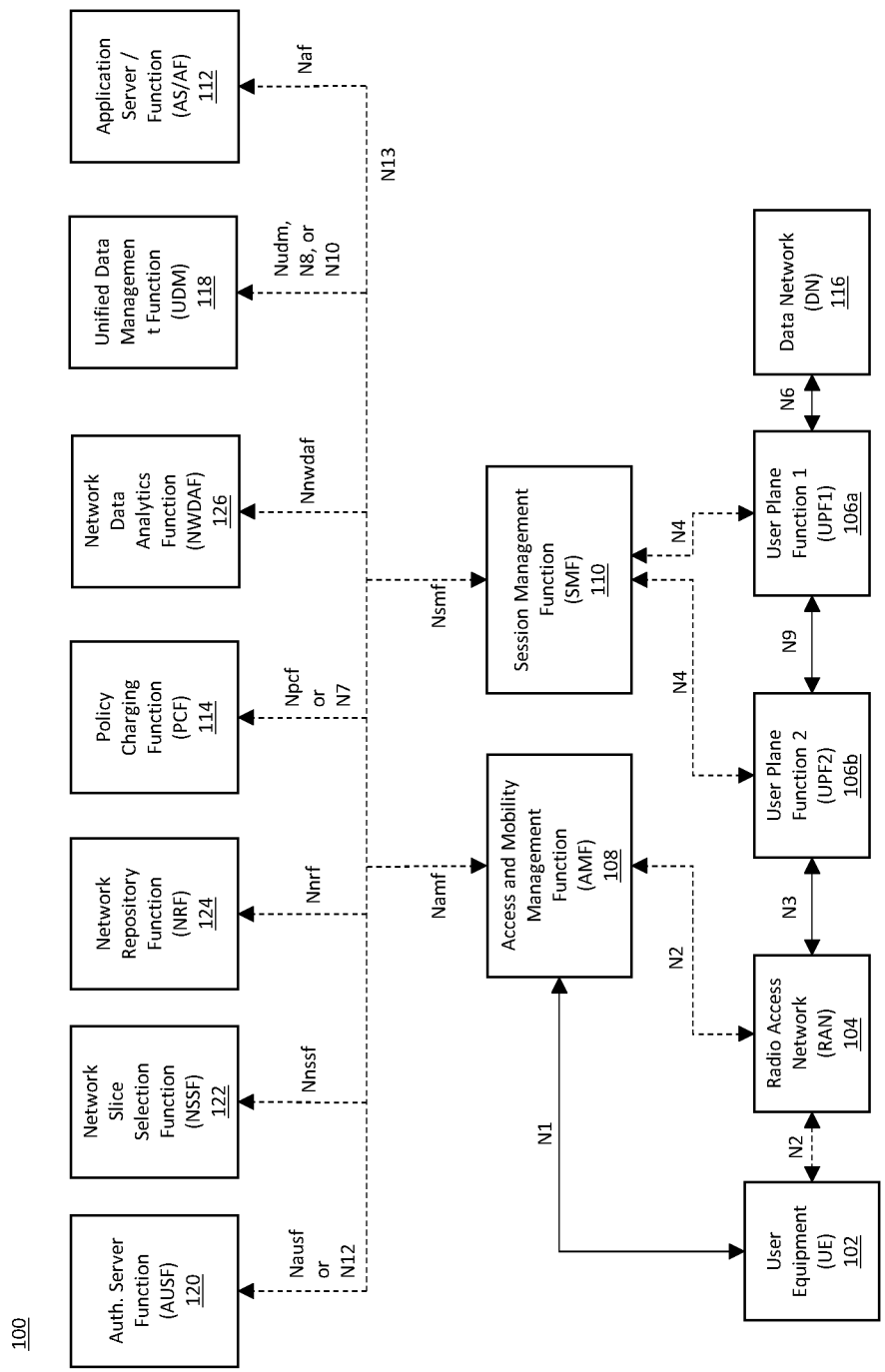
Figure 4:
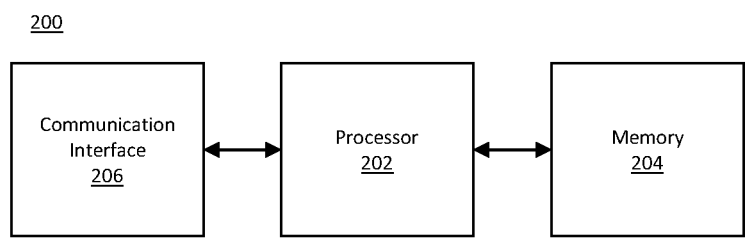
Figure 5:
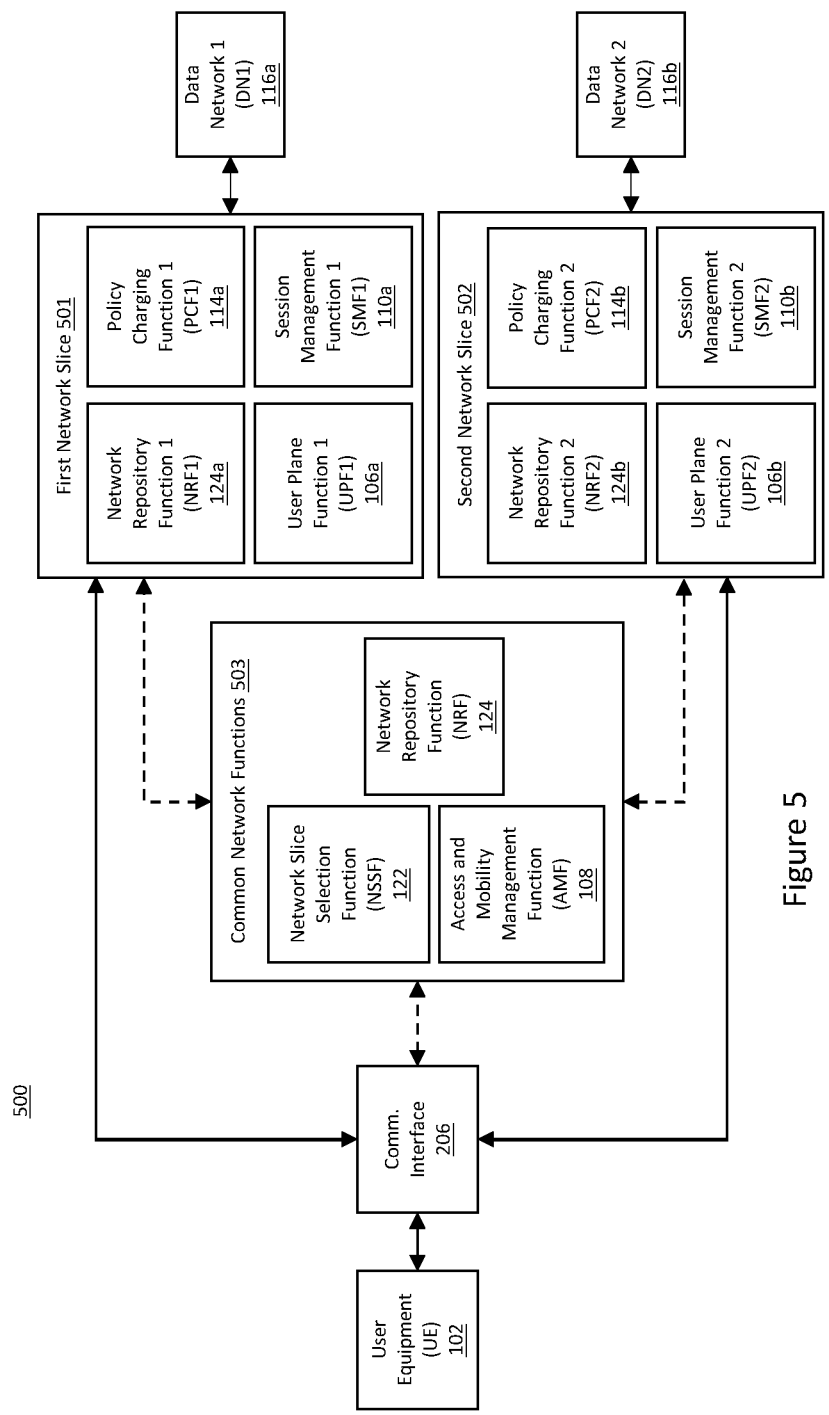
Figure 6:
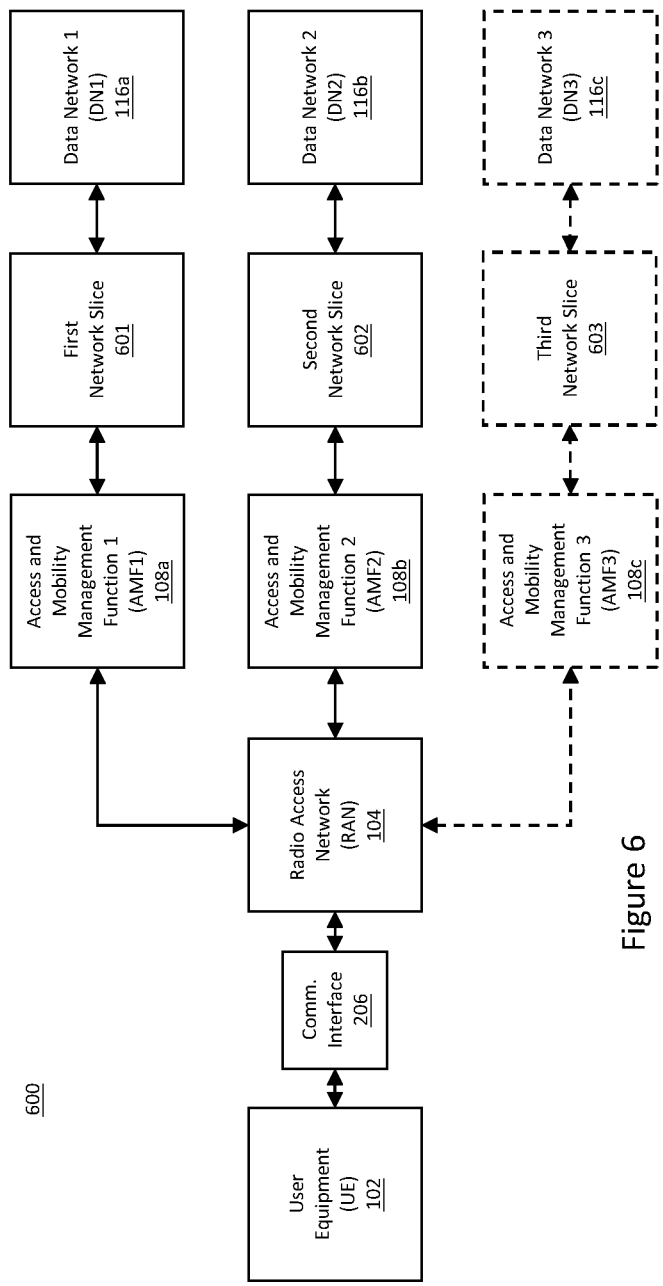
Figure 7:
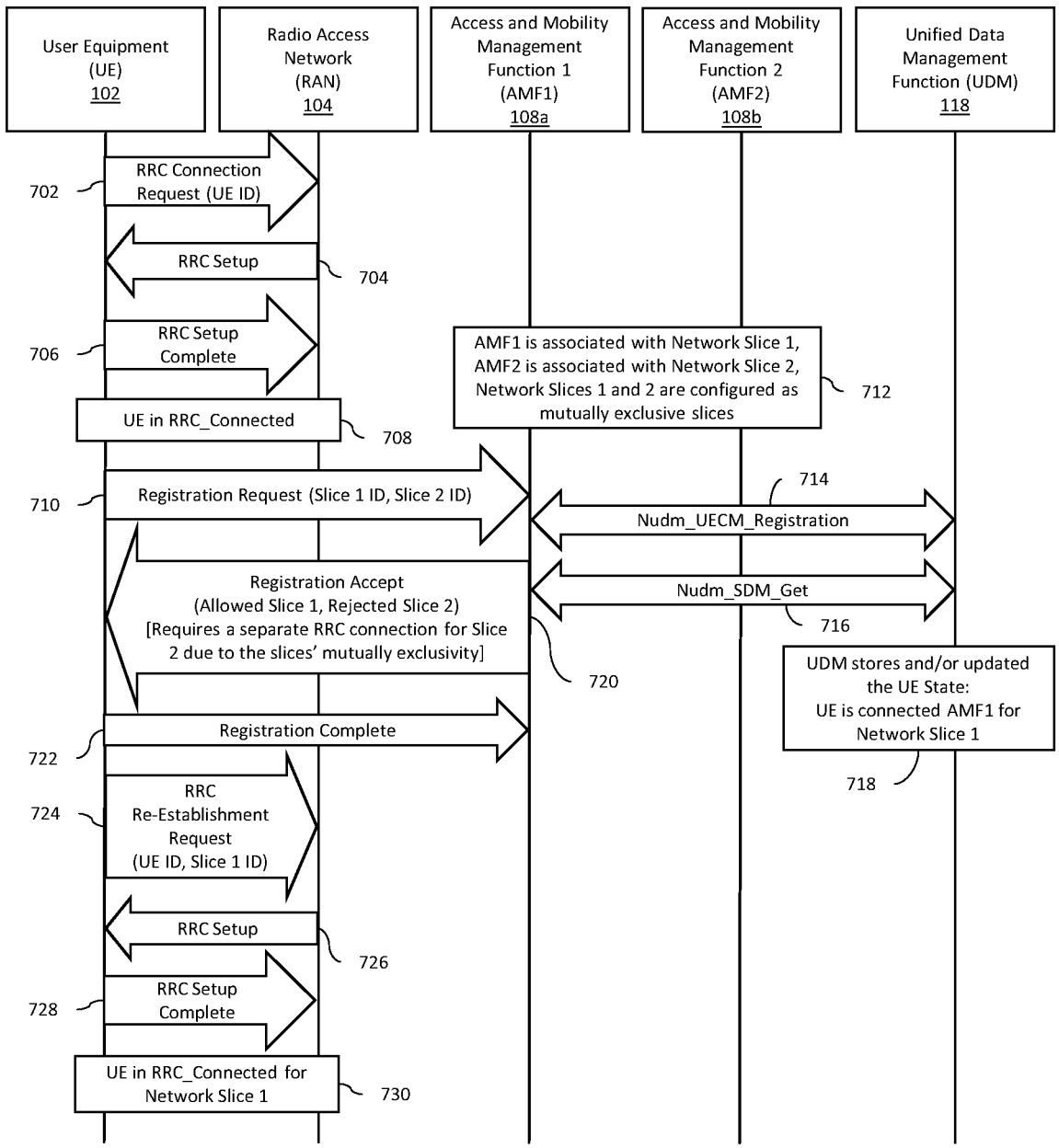
Figure 8:
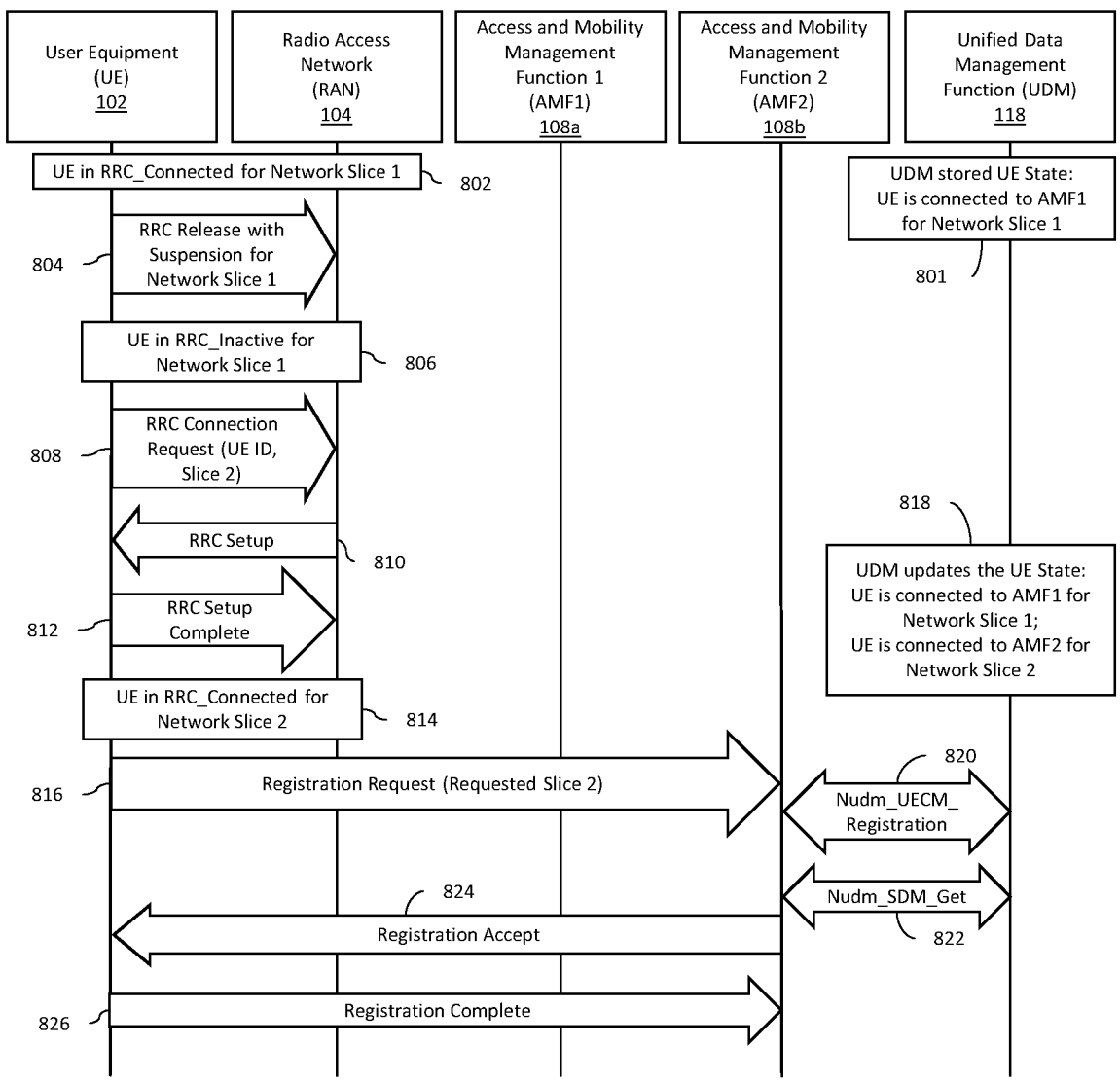
Figure 9:
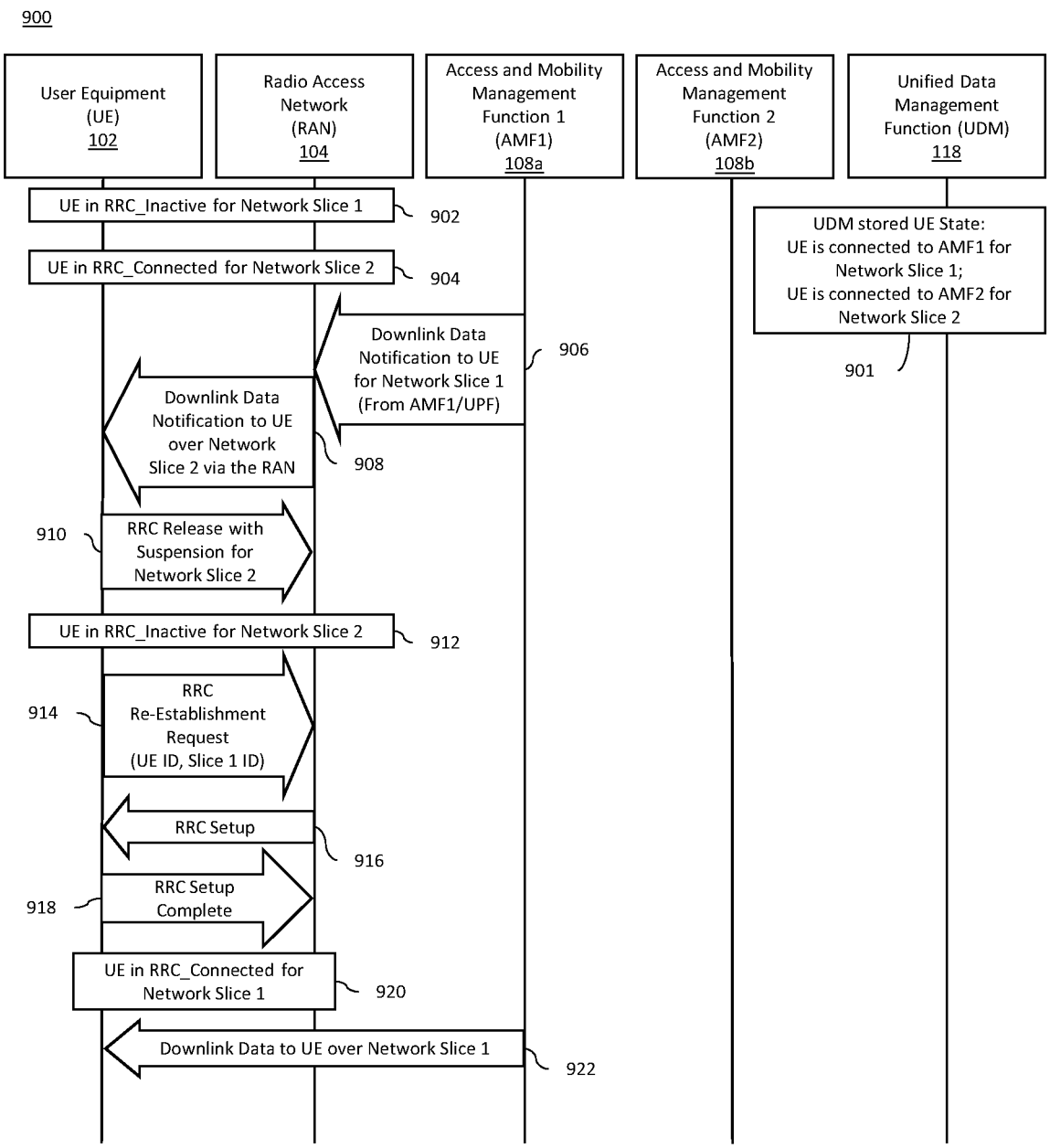
Figure 10:
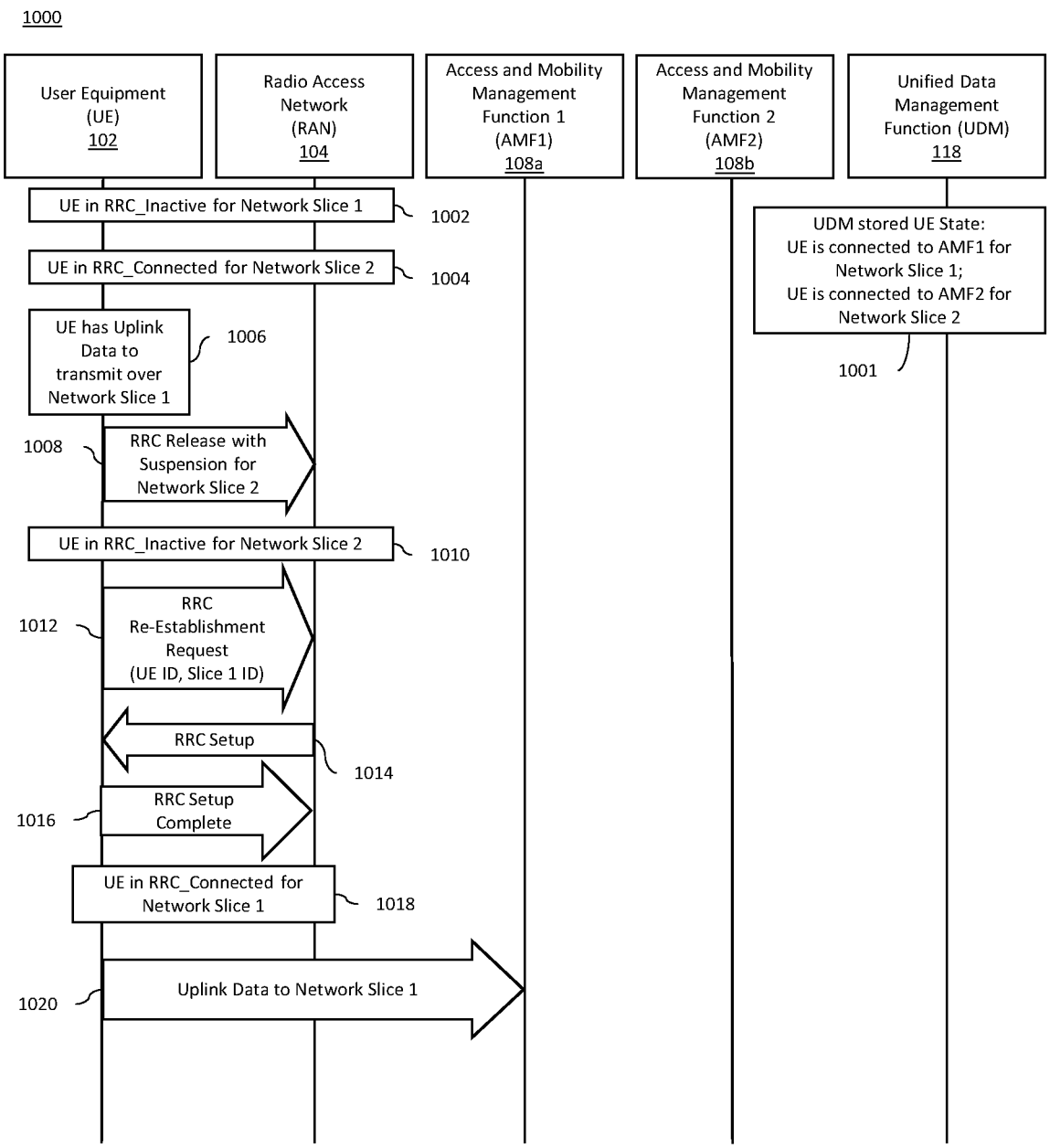
Figure 11:
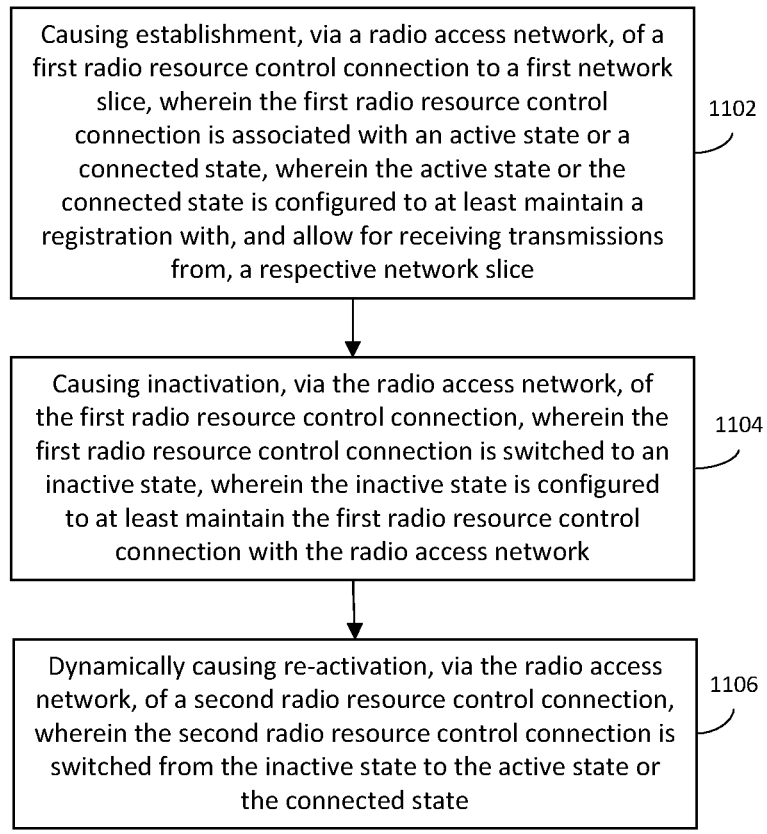
Figure 12:
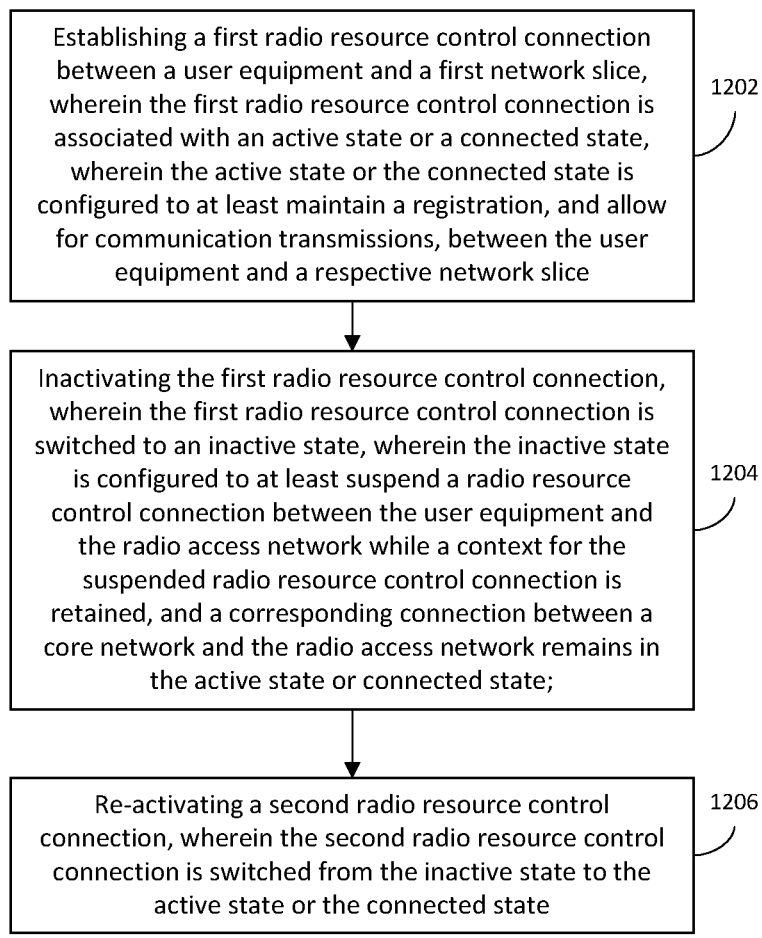
Figure 13:
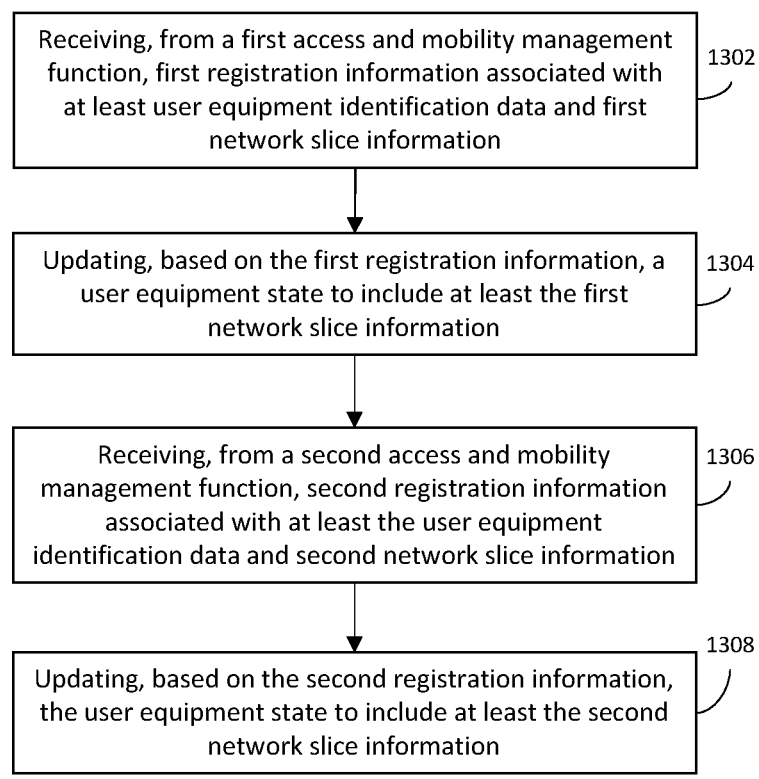
Figure 14:
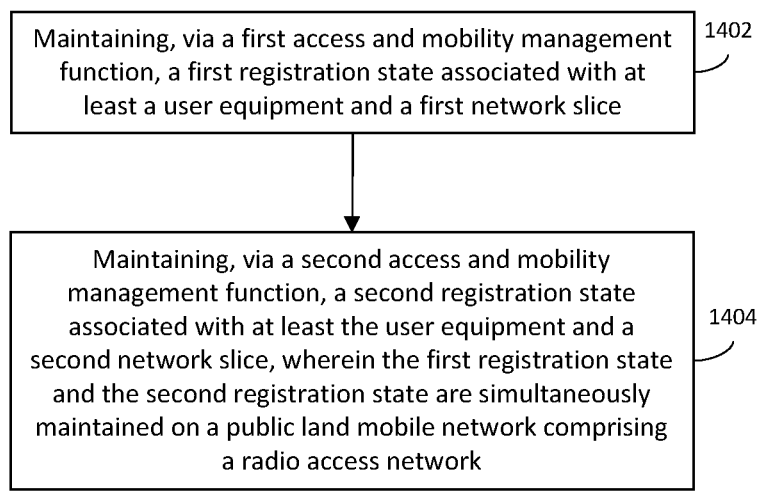
Figure 15:
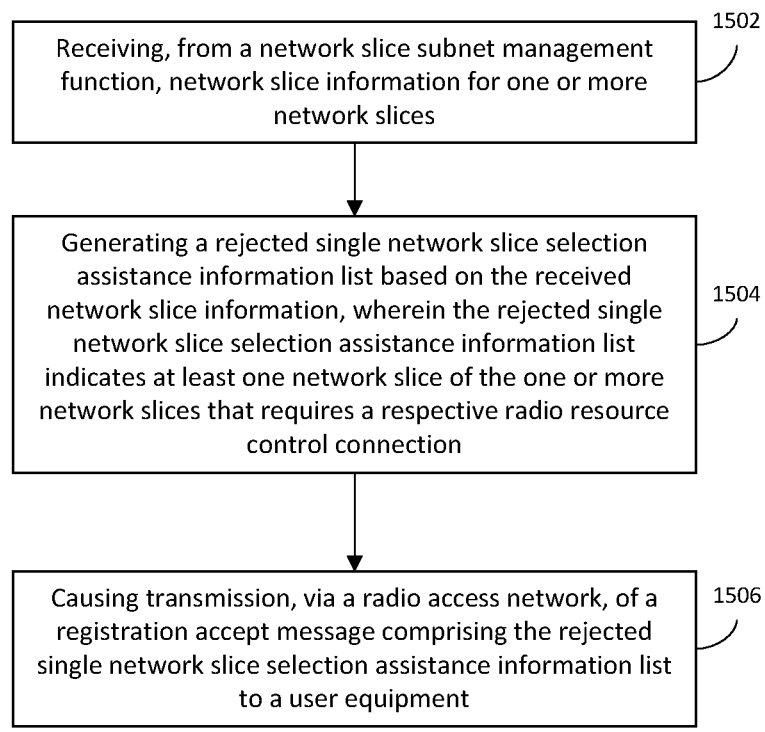

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates an example architecture for a communications network comprising network slices, according to some embodiments;

FIG. 6 illustrates an example architecture for a communications network comprising network slices, according to some embodiments;

FIG. 7 is a flow diagram illustrating the signaling between communication devices via a network infrastructure, according to some embodiments;

FIG. 8 is a flow diagram illustrating the signaling between communication devices via a network infrastructure, according to some embodiments;

FIG. 9 is a flow diagram illustrating the signaling between communication devices via a network infrastructure, according to some embodiments;

FIG. 10 is a flow diagram illustrating the signaling between communication devices via a network infrastructure, according to some embodiments;

FIG. 11 is a flow chart illustrating the operations performed, such as by a communication device or other client device, in accordance with some example embodiment;

FIG. 12 is a flow chart illustrating the operations performed, such as by a communication device or other client device, in accordance with some example embodiment;

FIG. 13 is a flow chart illustrating the operations performed, such as by a communication device or other client device, in accordance with some example embodiment;

FIG. 14 is a flow chart illustrating the operations performed, such as by a communication device or other client device, in accordance with some example embodiment; and FIG. 15 is a flow chart illustrating the operations performed, such as by a communication device or other client device, in accordance with some example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure. Thus, use of any such terms should not be taken to limit the spirit and scope of embodiments of the present disclosure.

Additionally, as used herein, the terms "network slice," "specific slice," "slice," "network portion," and similar terms can be used interchangeably to refer to an end to end logical communication network, or portion thereof, within a Public Land Mobile Network (PLMN), Stand-Alone Non-Public Network (SNPN), a Public Network Integrated NPN (PNI-NPN), the like, or combinations thereof.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail these example embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points, the like (e.g., wireless transmitter and/or receiver nodes providing access points for a radio access communication system and/or other forms of wired and/or wireless networks), or combinations thereof. Such wired and/or wireless networks include, but are not limited to, networks configured to conform to 2G, 3G, 4G, LTE, 5G, and/or any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface (e.g., global positioning system receiver/transmitter, keyboard, mouse, touchpad, display, universal serial bus (USB), Bluetooth, ethernet, wired/wireless connections, the like, or combinations thereof). Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2 interface, an S1 interface, a similar interface, or combinations thereof. This interface can be used for example for coordination of operation of the stations and performing reselection or handover operations. The logical communication connection between the initial communication node and the final communication node of the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or combinations thereof. For example, the device can be a handheld data processing device equipped with radio receiver, data processing and user interface apparatus. Non-limiting examples include a mobile station (MS) such as a mobile phone or what is known as a 'smart phone,' a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, Universal Serial Bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device or user equipment. A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage, and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via one or more appropriate apparatuses for receiving and transmitting signals (e.g., global positioning system receiver/transmitter, remote touchpad interface with remote display, Wi-Fi interface, etc.). In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment 102 (UE 102) and a Data Network 116 (DN 116) via a Core Network 101 (CN 101) of the communications network 100. The UE 102 can be associated with one or more devices associated with one or more network function (NF) service consumers. As illustrated in FIG. 1, a communications network 100 can be provided in which the UE 102 is in operable communication with the Radio Access Network 104 (RAN 104), such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, the like, or combinations thereof. In some embodiments, the DN 116 or the CN 101 can be in communication with an Application Server or Application Function 112 (AS/AF 112). The RAN 104, CN 101, DN 116, and/or AS/AF 112 can be associated with a Network Repository Function (NRF), NF service producer, Service Communication Proxy (SCP), Security Edge Protection Proxy (SEPP), Policy Charging Function (PCF), the like, or combinations thereof.

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example only, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communication (GSM), Universal Mobile Telecommunications System (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (MIMO) antennas. In some embodiments, the communications network 100 can comprise Multi-User MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, Wi-Fi cellular convergence, Non-Orthogonal Multiple Access (NOMA), channel coding, the like, or combinations thereof.

As illustrated in FIG. 3, the UE 102 can be configured to communicate with the RAN 104 in a N1 interface, e.g., according to a Non-Access Stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a fifth-generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as server or other computing device are depicted in accordance with an example embodiment of the present disclosure. As described below in conjunction with the flowcharts and block diagrams presented herein, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless network or a wireless local area network. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206.

Although not illustrated, the apparatus of an example embodiment may also optionally include a user interface, such as a touch screen, a display, a keypad, the like, or combinations thereof. Moreover, the apparatus according to example embodiments can be configured with a global positioning circuit that comprises a global positioning receiver and/or global positioning transmitter configured for communication with one or more global navigation satellite systems (e.g., GPS, GLONASS, Galileo, the like, or combinations thereof). The global positioning circuit may be configured for the transmission and/or receipt of direct/indirect satellite and/or cell signals in order to determine geolocation data (e.g., latitude, longitude, elevation, altitude, geographic coordinates, the like, or combinations thereof.) for the apparatus and/or another communication device associated with the apparatus or the one or more global navigation satellite systems.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, the like, or combinations thereof for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present invention on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Micro-Controller Unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA, the like, or combinations thereof the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present invention by further configuration of the processor by instructions for performing the algorithms and/or operations described herein. The processor can include, among other things, a clock, an Arithmetic Logic Unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as NF, NRF, a base station, an access point, SCP, UE 102, RAN 104, core network services, AS/AF 112, a database or other storage device, the like, or combinations thereof. In this regard, the communication interface can include, for example, one or more antennas and supporting hardware and/or software for enabling communications with a wireless communication network. Additionally or alternatively, the communication interface can include the circuitry for interacting with the one or more antennas to cause transmission of signals via the one or more antennas or to handle receipt of signals received via the one or more antennas. In some embodiments, the one or more antennas may comprise one or more of a dipole antenna, monopole antenna, helix antenna, loop antenna, waveguide, horn antenna, parabolic reflectors, corner reflectors, dishes, micro strip patch array, convex-plane, concave-plane, convex-convex, concave-concave lenses, the like or combinations thereof. In some environments, the communication interface can alternatively or also support wired communication. As such, for example, the communication interface can include a communication modem and/or other hardware/software for supporting communication via cable, Digital Subscriber Line (DSL), USB, the like or combinations thereof. In some embodiments, a session management function (e.g., SMF 110) can comprise a 5GC session management function for any suitable Control and User Plane Separation (CUPS) architecture, such as for the General Packet Radio Service (GPRS), Gateway GPRS Support Node Control plane function (GGSN-C), Trusted Wireless Access Gateway Control plane function (TWAG-C), Broadband Network Gateway Control and User Plane Separation (BNG-CUPS), N4-Interface, Sxa-Interface, Sxb-Interface, Sxc-Interface, Evolved Packet Core (EPC) Serving Gateway Control plane function (SGW-C), EPC Packet Data Network Gateway Control plane function (PGW-C), EPC Traffic Detection Control plane function (TDF-C), the like, or combinations thereof.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, Wireless Local Access Network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), the like, or combinations thereof. In addition, these signals can include speech data, user generated data, user requested data, the like, or combinations thereof.

For example, the apparatus 200 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, Session Initiation Protocol (SIP)), the like, or combinations thereof. For example, the apparatus 200 can be capable of operating in accordance with 2G wireless communication protocols Interim Standard (IS) 136 (IS-136), Time Division Multiple Access (TDMA), GSM, IS-95, Code Division Multiple Access, Code Division Multiple Access (CDMA), the like, or combinations thereof. In addition, for example, the apparatus 200 can be capable of operating in accordance with 2.5G wireless communication protocols GPRS, Enhanced Data GSM Environment (EDGE), the like, or combinations thereof. Further, for example, the apparatus 200 can be capable of operating in accordance with 3G wireless communication protocols, such as UMTS, Code Division Multiple Access 2000 (CDMA2000), Wideband Code Division Multiple Access (WCDMA), Time Division-Synchronous Code Division Multiple Access (TD-SCDMA), the like, or combinations thereof. The NA 200 can be additionally capable of operating in accordance with 3.9G wireless communication protocols, such as Long Term Evolution (LTE), Evolved Universal Terrestrial Radio Access Network (E-UTRAN), the like, or combinations thereof. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GGSN-C, TWAG-C, Broadband Network Gateways (BNGs), N4-Interface, Sxa-Interface, Sxb-Interface, Sxc-Interface, EPC SGW-C, EPC PGW-C, EPC TDF-C, the like, or combinations thereof. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4. The computer-readable medium can comprise a non-transitory computer-readable storage medium that can be any media that can contain or store the instructions for use by or in connection with an instruction execution system, apparatus, or device, such as a computer.

FIG. 5 illustrates an example communication network 500 that comprises two example network slices. The UE 102 utilizes at least Communication Interface 206 to establish one or more network connections by way of causing transmission and receipt of communication signals between the UE 102 via at least Communication Interface 206 and the Common Network Functions 503, the First Network Slice 501, and/or the Second Network Slice 502. It will be appreciated that, in some embodiments, the Communication Interface 206 can connect the UE 102 directly to the First Network Slice 501 and/or the Second Network Slice 502 thus bypassing the Common Network Functions 503. In some such embodiments, wherein the UE 102 directly connects to the First Network Slice 501 and/or the Second Network Slice 502 it will be appreciated that each respective network slice may be configured with a respective AMF, or other functions illustrated as part of the Common Network Functions 503. Moreover, in some embodiments, the First Network Slice 501 and/or the Second Network Slice 502 may be configured with one or more of the network functions depicted in FIGS. 2-3, for example, AMF 108, SMF 110, PCF 114, NSSF 122, etc. Additionally, it will be appreciated that Communication Interface 206 can connect the UE 102 indirectly to the First Network Slice 501 and/or the Second Network Slice 502 by establishing a connection through the Common Network Functions 503 first. In some embodiments, UE 102 can connect to a plurality of public and/or private networks and/or a plurality of public and/or private network slices by way of Communication Interface 206. In some embodiments, Communication Interface 206 may be communicably connected to one or more of a RAN (e.g., RAN 104), cell, gNB, ng-eNB, NodeB, the like, or combinations thereof such that communication signals can be transmitted and received therethrough.

In the illustrated embodiment, the First Network Slice 501 comprises a plurality of network functions including at least Network Repository Function 1 (NRF1) 124a, Policy Charging Function 1 (PCF1) 114a, User Plane Function 1 (UPF1) 106a, and Session Management Function 1 (SMF1) 110a. Each of the network functions of the First Network Slice 501 is independent of the Common Network Functions 503 and the network functions of the Second Network Slice 502. Further, the First Network Slice 501 is configured to connect the UE 102 to Data Network 1 (DN1) 116a. The Second Network Slice 502 comprises a plurality of network functions including at least Network Repository Function 2 (NRF2) 124b, Policy Charging Function 2 (PCF2) 114b, User Plane Function 2 (UPF2) 106b, and Session Management Function 2 (SMF2) 110b. Each of the network functions of the Second Network Slice 502 is independent of the Common Network Functions 503 and the network functions associated with the First Network Slice 501. Further, the Second Network Slice 502 is configured to connect the UE 102 to Data Network 2 (DN2) 116b.

In some embodiments, the example communication network 500 of FIG. 5 comprises one or more of a Public Land Mobile Network (PLMN), Stand-Alone Non-Public Network (SNPN), a Public Network Integrated NPN (PNI-NPN), and/or the like. For example, the First Network Slice 501 may be configured, with Common Network Functions 502, as part of a PLMN such that UE 102 can access the First Network Slice 501 without undergoing onboarding procedures or authentication of credentials. Additionally, the Second Network Slice 502 may be configured as a PNI-NPN which operates with the support of the PLMN, that comprises the First Network Slice 501 and Common Network Functions 503, but further requires that UE 102 belongs to a particular tenant type in order to be eligible to use the Second Network Slice 502. Moreover, to access the Second Network Slice 502 UE 102 will have to undergo an onboarding procedure and/or authentication of credentials that incorporates the credentials associated with UE 102 and one or more Service Level Agreements (SLAs) and/or subscriptions. In an instance UE 102 is already subscribed to the Second Network Slice 502 then procedures for authentication of credentials may be initiated, by UE 102 or the Second Network Slice 502, without the need for additional onboarding procedures or registration procedures. It will also be appreciated that the First Network Slice 501 and/or the Second Network Slice 502 may be configured, in accordance with some embodiments, as a network separate from example communication network 500, rather than as a network slice, such as an SNPN that supports authentication and/or onboarding procedures. Moreover, in some embodiments a plurality of additional network slices (e.g., a third network slice, fourth network slice, etc.) may be incorporated into example communication network 500 with each network slice configured with or without authentication feature requirements, with or without onboarding features for unregistered user equipment, and/or a plurality of network functions (e.g., an NRF, UPF, PCF, SMF, AS/AF, AUSF, DN, etc.).

FIG. 6 illustrates an example communication network 600 that comprises three example network slices in a mutually exclusive configuration (e.g., disjoint, isolated, etc.). In some embodiments, the example communication network 600 may further comprise a plurality of Third Network Slices 603. In some embodiments, example communication network 600 may be configured without the Third Network Slice 603. In some embodiments, one or more of AMF1 108a, AMF2 108b, or AMF3 108c may be configured to support a plurality of network slices. For example, AMF1 108a may be configured to support connections between UE 102, via RAN 104, to a plurality of network slices in one or more deployment configurations (e.g., disjoint slices, isolated slices, etc.).

As depicted, UE 102 utilizes at least Communication Interface 206 to establish one or more network connections (e.g., RRC connections, etc.) by way of causing transmission and receipt of communication signals between the UE 102 and RAN 104. In some embodiments, RAN 104 may be configured as a shared RAN being communicably connected with one or more independent networks and/or independent network slices thereof. It will be appreciated that, in some embodiments, UE 102 can connect independently to the First Network Slice 601, the Second Network Slice 602, and/or the Third Network Slice 603 by way of an RRC connection supported at least partially by RAN 104 and the respective AMF associated with the connected network slice (e.g., AMF1 108a, AMF2 108b, AMF3 108c).

An example deployment scenario of communication network 600, illustrated by FIG. 6, shows UE 102 being configured with multiple subscriptions to each of the multiple network slices. The example deployment of communication network 600 is shown with a First Network Slice 601, a Second Network Slice 602, and a Third Network Slice 603 configured across three disjoint networks. RAN 104 is configured to connect to each of the three disjoint networks via their respective AMFs illustrated as AMF1 108a, AMF2 108b, and AMF3 108c. Each of AMF1 108a, AMF2 108b, and AMF3 108c are configured on their respective networks with their corresponding network slices. It will be appreciated that each of the three network slices are isolated from the other two network slices and because of this deployment configuration more than one network slice cannot be simultaneously provided to the UE by RAN 104. Moreover, while FIG. 6 shows three network slices and three AMFs, it will be appreciated, in light of the present disclosure, that the functionality is extendable to a plurality of disjoint and/or isolated network slices.

In some embodiments, UE 102 is configured with subscriptions, SLAs, the like, or combinations thereof to one or more of the First Network Slice 601, Second Network Slice 602, Third Network Slice 603, the like, or combinations thereof. In some embodiment, UE 102 is configured with identification information which comprises one or more of an identification of applications that utilize services provided by one or more network slices, a list of services provided by one or more network slices, network slice credentials, network slice identification information (e.g., IP Address, etc.), the like, or combinations thereof. In some embodiments, information regarding the disjoint and/or isolated network slices can be indicated by a default AMF (e.g., AMF1 108a, etc.) during initial registration, this information may identify which of the available network slices require separate RRC connections and which, if any, can be accessed by UE 102 via a single RRC connection. In some embodiments, two or more network slices may be configured to share a single RRC connection for communication with UE 102. In some embodiments, one or more of the First Network Slice 601, Second Network Slice 602, Third Network Slice 603, the like, or combinations thereof may be configured to provide services and/or network functionality to UE 102. In some embodiments, one or more of the First Network Slice 601, Second Network Slice 602, Third Network Slice 603, the like, or combinations thereof may be configured to provide UE 102 with access to a respective data network (e.g., Data Networks 116a-116c, etc.).

FIG. 7 illustrates a flow chart that depicts an example signal sequence 700, for the provision of registration with a first network slice and establishment of a first RRC connection therewith. The communication signal transmission, described with respect to signal sequence 700, occurs between communication devices (e.g., apparatus 200, etc.) by way of a network infrastructure (e.g., communications network 100, 500, 600 etc.). As shown the network infrastructure deployment comprises at least UE 102, RAN 104, AMF1 108a, AFM2 108b, and UDM 118. As shown by block 702, UE 102 triggers RRC establishment procedures by causing transmission of an RRC connection request, to RAN 104, comprising identification information for UE 102. In some embodiments, the RRC connection request comprises an indication of the requested network slice with the identification information for UE 102. In response RAN 104 returns an RRC setup response to UE 102, see block 704. Upon receipt of the RRC setup response, received from RAN 104, UE 102 causes transmission of an RRC setup complete reply to RAN 104, see block 706. As shown by block 708 the RRC connection between UE 102 and RAN 104 is established. With the RRC connection to RAN 104 established, UE 102 may cause transmission of a registration request, via RAN 104, to one or more network slices, as shown in block 710. In some embodiments, the registration request comprises identification information for the network slices with which UE 102 is requesting to register.

As illustrated, by block 712 AMF1 108a is associated with Network Slice 1, AMF2 108b is associated with Network Slice 2, and Network Slices 1 and 2 are configured as mutually exclusive slices (e.g., disjoint, isolated, etc.). In response to the registration request received from UE 102, RAN 104 selects AMF1 108a based on the registration request slice identification information and further causes transmission of the registration request to AMF1 108a, see again block 710. Upon receipt of the registration request, AMF1 108a causes Nudm_UECM_Registration and Nudm_SDM_Get communication signal transmission to occur between AMF1 108a and UDM 118, see blocks 714 and 716 respectively. In response to the Nudm procedures, UDM 118 stores the registration state for UE 102 based on the requested network slices and updates the details for AMF1 108a which is now serving UE 102, see block 718. In some embodiments, UE 102 may already have a registration state stored with UDM 118 and in such an instance UDM 118 updates UE 102's registration state to reflect the new details provided by AMF1 108a. In some embodiments, AMF1 108a, or the like (e.g., AMF2 108b, etc.) may serve UE 102 with services provided by one or more network slices.

As shown in block 720, once AMF1 108a has provided the registration details to UDM 118, AMF1 108a causes transmission, via RAN 104 to UE 102, of a registration acceptance response. In some embodiments, the registration acceptance response may comprise information that indicates that the registration for Network Slice 1 was allowed, but due to the network deployment the registration for Network Slice 2 was rejected. In some embodiments, for UE 102 to successfully connect to and register with Network Slice 2 a separate RRC connection must be established. In some embodiment, Network Slice 2 is included in the rejected S-NSSAI list provided to UE 102, by AMF1 108a, because even though both Network Slice 1 and 2 are allowed for UE 102 in the network (e.g., PLMN, etc.) AMF1 108a only supports Network Slice 1. As shown in block 722, UE 102 provides a registration complete response to RAN 104 upon receipt of the registration acceptance signal. Upon successful completion of the aforementioned registration procedures, UE 102 may update the RRC connection to RAN 104, by causing transmission of an RRC re-establishment request, to specify that the connection is specific to Network Slice 1, thus establishing RRC context for UE 102 to switch between other RRC connections, see block 724. In some embodiments the RRC establishment request comprises identification information to identify UE 102 and Network Slice 1 to RAN 104. In response RAN 104 returns an RRC setup response to UE 102, see block 726. Upon receipt of the RRC setup response, received from RAN 104, UE 102 causes transmission of an RRC setup complete reply to RAN 104, see block 728. As shown by block 730 the RRC connection between UE 102 and Network Slice 1, via RAN 104, is established.

FIG. 8 illustrates a flow chart that depicts an example signal sequence 800, for the provision of registration with a second network slice and establishment of a second RRC connection therewith while maintaining the first RRC connection with the first network slice. The communication signal transmission, described with respect to signal sequence 800, occurs between communication devices (e.g., apparatus 200, etc.) by way of a network infrastructure (e.g., communications network 100, 500, 600 etc.). As shown the network infrastructure deployment comprises at least UE 102, RAN 104, AMF1 108a, AFM2 108b, and UDM 118. As shown by block 802 the RRC connection between UE 102 and Network Slice 1, via RAN 104, is already established. UE 102 causes transmission of an RRC release request, with suspension for the RRC connection to Network Slice 1, to RAN 104, see block 804. In response to receipt of the RRC release request RAN 104 causes the RRC connection between UE 102 and Network Slice 1 to be made inactive, see block 806.

As shown by block 808, UE 102 triggers RRC establishment procedures by causing transmission of an RRC connection request, to RAN 104, comprising identification information for UE 102 and Network Slice 2. In response RAN 104 returns an RRC setup response to UE 102, see block 810. Upon receipt of the RRC setup response, received from RAN 104, UE 102 causes transmission of an RRC setup complete reply to RAN 104, see block 812. As shown by block 814 the RRC connection between UE 102 and Network Slice 2 via RAN 104 is established. With the RRC connection to Network Slice 2 by way of RAN 104 established, UE 102 may cause transmission of a registration request, via RAN 104, to Network Slice 2 by way of at least AMF2 108b, as shown in block 816. In some embodiments, the registration request comprises identification information for Network Slice 2 with which UE 102 is requesting to register.

In response to the registration request received from UE 102, RAN 104 selects AMF 2 108b based on the registration request slice identification information and further causes transmission of the registration request to AMF2 108b, see again block 816. Upon receipt of the registration request, AMF2 108b causes Nudm_UECM_Registration and Nudm_SDM_Get communication signal transmission to occur between AMF2 108b and UDM 118, see blocks 820 and 822 respectively. In some embodiments, UDM 118 may already have stored information for UE 102 and one or more associated registration states, for example, UDM may have previously stored registration state information to identify that UE 102 is connected to AMF1 108b for service to Network Slice 1, see block 801. In response to the Nudm procedures, UDM 118 stores the registration state for UE 102 based on the requested Network Slice 2 and updates the details for AMF2 108b which is now serving UE 102 for functions associated with Network Slice 2, see block 818. In some embodiments, AMF2 108b, or the like (e.g., AMF1 108a, etc.) may serve UE 102 with services provided by one or more network slices.

As shown in block 824, once AMF2 108b has provided the registration details to UDM 118, and in response AMF2 108b causes transmission, via RAN 104 to UE 102, of a registration acceptance response. As shown in block 826, UE 102 provides a registration complete response to AMF2 108b, by way of RAN 104, upon receipt of the registration acceptance signal. In some embodiments, upon successful completion of the aforementioned registration procedures, UE 102 may update the RRC connection to Network Slice 2 with RAN 104 to specify that the connection is specific to Network Slice 2, thus establishing RRC context for UE 102 to switch between other RRC connections (e.g., an RRC connection to Network Slice 1, etc.).

FIG. 9 illustrates a flow chart that depicts an example signal sequence 900, for the provision of switching between disjoint and/or isolated network slices to allow for receipt of downlink data by user equipment and switching the RRC connection state. The communication signal transmission, described with respect to signal sequence 900, occurs between communication devices (e.g., apparatus 200, etc.) by way of a network infrastructure (e.g., communications network 100, 500, 600 etc.). As shown the network infrastructure deployment comprises at least UE 102, RAN 104, AMF1 108a, AFM2 108b, and UDM 118. As shown by block 902, UE 102 has a first RRC connection to Network Slice 1 which is in the inactive or idle state. Additionally, UE 102 has a second RRC connection to Network Slice 2 which is in the active or connected state, see block 904. It will be appreciated that an RRC connection in the active or connected state can be utilized by UE 102 to receive signals from, or cause transmission of signals to, a network slice via RAN 104, while an RRC connection in the inactive or idle state cannot be utilized by UE 102 to receive signals from, or cause transmission of signals to, a network slice via RAN 104 without being switched to the active or connected state. Moreover, an RRC connection in the inactive or idle state maintains the registration previously established between UE 102 and the network slice associated with the RRC connection in the inactive or idle state. In the illustrated deployment, UDM 118 has previously stored registration state information associated with UE 102 such that UE 102 is known to be connected to AMF1 108a for Network Slice 1 and to AMF2 108b for Network Slice 2, see block 901.

As shown in block 906, AMF1 108a causes transmission of a downlink data notification to RAN 104 for Network Slice 1. In some embodiments, the downlink data notification may be generated by AMF1 108a or another network function associated with Network Slice 1 (e.g., a UPF, etc.). Upon receipt of the downlink data notification, RAN 104 further causes transmission of the downlink data notification to UE 102 over the active, or connected, second RRC connection associated with UE 102 and Network Slice 2, see block 908. As shown in block 910, in response to receipt of the downlink data notification, UE 102 causes transmission of an RRC release request, with suspension for the second RRC connection associated with Network Slice 2, to RAN 104. In response to receipt of the RRC release request RAN 104 causes the RRC connection between UE 102 and Network Slice 2 to be made inactive, see block 912.

Upon successful inactivation of the RRC connection to Network Slice 2, UE 102 causes transmission of an RRC connection re-establishment request to RAN 104 in order to activate, or re-connect, the RRC connection to Network Slice 1, see block 914. In some embodiments the RRC re-establishment request comprises identification information to identify UE 102 and Network Slice 1 to RAN 104. In response RAN 104 activates, or resumes, the first RRC connection to Network Slice 1 and returns an RRC setup response to UE 102, see block 916. Upon receipt of the RRC setup response, received from RAN 104, UE 102 causes transmission of an RRC setup complete reply to RAN 104, see block 918. As shown by block 920 the RRC connection between UE 102 and Network Slice 1, via RAN 104, is switched from inactive, or idle, to active or connected. With the RRC connection between UE 102 and Network Slice 1 active, or connected, UE 102 can receive the available downlink data from Network Slice 1 as shown in block 922. In some embodiments, UE 102 may repeat the procedures outlined by FIG. 9 to dynamically switch between the first RRC connection and the second RRC connection to continuously receive downlink data as it is made available by either Network Slice 1 or Network Slice 2.

FIG. 10 illustrates a flow chart that depicts an example signal sequence 1000, for the provision of switching between disjoint and/or isolated network slices to allow for transmission of uplink data by user equipment and switching the RRC connection state. The communication signal transmission, described with respect to signal sequence 1000, occurs between communication devices (e.g., apparatus 200, etc.) by way of a network infrastructure (e.g., communications network 100, 500, 600 etc.). As shown the network infrastructure deployment comprises at least UE 102, RAN 104, AMF1 108a, AFM2 108b, and UDM 118. As shown by block 1002, UE 102 has a first RRC connection to Network Slice 1 which is in the inactive or idle state. Additionally, UE 102 has a second RRC connection to Network Slice 2 which is in the active or connected state, see block 1004. It will be appreciated that an RRC connection in the active or connected state can be utilized by UE 102 to receive signals from, or cause transmission of signals to, a network slice via RAN 104, while an RRC connection in the inactive or idle state cannot be utilized by UE 102 to receive signals from, or cause transmission of signals to, a network slice via RAN 104 without being switched to the active or connected state. Moreover, an RRC connection in the inactive or idle state maintains the registration previously established between UE 102 and the network slice associated with the RRC connection in the inactive or idle state. In the illustrated deployment, UDM 118 has previously stored registration state information associated with UE 102 such that UE 102 is known to be connected to AMF1 108a for Network Slice 1 and to AMF2 108b for Network Slice 2, see block 1001.

As shown in block 1006, UE 102 has uplink data to transmit over the RRC connection associated with Network Slice 1. In some embodiments, the uplink data may be generated by UE 102 and/or an application associated with UE 102. For example, UE 102 may be running, at least in part, a mapping application to navigate to a particular location and the mapping application needs to provide location information (e.g., current GPS coordinates for UE 102, etc.) to a network function associated with Network Slice 1. In another example, UE 102 may receive downlink data from another network slice that it need to provide to a function associated with Network Slice 1. In some embodiments, uplink data may need to be provide to a network slice to receive or access a service associated with that particular network slice. As shown in block 1008, in response to receipt or generation of the uplink data, UE 102 causes transmission of an RRC release request, with suspension for the second RRC connection associated with Network Slice 2, to RAN 104. In response to receipt of the RRC release request RAN 104 causes the RRC connection between UE 102 and Network Slice 2 to be made inactive, see block 1010.

Upon successful inactivation of the RRC connection to Network Slice 2, UE 102 causes transmission of an RRC connection re-establishment request to RAN 104 in order to activate, or re-connect, the RRC connection to Network Slice 1, see block 1012. In some embodiments the RRC re-establishment request comprises identification information to identify UE 102 and Network Slice 1 to RAN 104. In response, RAN 104 activates, or resumes, the first RRC connection to Network Slice 1 and returns an RRC setup response to UE 102, see block 1014. Upon receipt of the RRC setup response, received from RAN 104, UE 102 causes transmission of an RRC setup complete reply to RAN 104, see block 1016. As shown by block 1018, the RRC connection between UE 102 and Network Slice 1, via RAN 104, is switched from inactive, or idle, to active or connected. With the RRC connection between UE 102 and Network Slice 1 active, or connected, UE 102 can cause transmission of the uplink data to Network Slice 1 as shown in block 1020. In some embodiments, UE 102 may repeat the procedures outlined by FIGS. 9-10 to dynamically switch between the first RRC connection and the second RRC connection to continuously receive downlink data as it is made available by either Network Slice 1 or Network Slice 2 and/or to continuously cause transmission of uplink data, as it is received or generated by UE 102, to either Network Slice 1 or Network Slice 2. In some embodiments, UE 102 may cause switching of RRC connections based on a consideration to minimize the total number of service disruptions associated with one or more applications. For example, UE 102 may cause switching from a first RRC connection to a second RRC connection to cause transmission of uplink data and then, upon successful transmission, immediately switch back to the first RRC connection because downlink data is expected to be received based on a predefined receipt schedule (e.g., periodically updated downlink data, etc.).

FIG. 11 illustrates a flowchart of the operations of an example method 1100 performed by an example apparatus 200 which, in some embodiments, may be embodied by a network-based computing device, or other network entity, which may, in turn, be comprised of a computer program product comprising a non-transitory computer readable medium storing computer program code to be executed by processor 202. As shown in block 1102, apparatus 200 of this example embodiment incudes means, such as the processor 202, the memory 204, the communication interface 206 or the like, for causing establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice. As shown in block 1104, apparatus 200 is further configured with means, such as the processor 202, the communication interface 206 or the like, for causing inactivation, via the radio access network, of the first radio resource control connection, wherein the first radio resource control connection is switched to an inactive state, wherein the inactive state is configured to at least maintain the first radio resource control context with the radio access network. As shown in block 1106, apparatus 200 is further configured with means, such as the processor 202, the communication interface 206 or the like, for dynamically causing re-activation, via the radio access network, of a second radio resource control connection, wherein the second radio resource control connection is switched from the inactive state to the active state or the connected state.

As outlined by FIG. 11, one or more network entities, for example, a UE, is configured to establish an RRC connection with a RAN (e.g., a gNB, NodeB etc.). Once an established RRC connection is made with the RAN the UE can further request and a connection to one or more particular network slices. In some embodiments, the network slices may be mutually exclusive, for example, disjoint slices, and because of this deployment each slice may require an independent RRC connection to communicate with the UE. In response to the one or more network slice connection requests the UE may establish a first RRC connection to a first network slice and then further cause this first RRC connection to be made inactive by the RAN. In some embodiments, with the first RRC connection inactivated, the UE may request a second RRC connection to a second network slice. However, if the second RRC connection was previously connected and made inactive then the UE may cause a re-activation of the second RRC connection to communicate with the second network slice. With both the first and second RRC connections established the UE can dynamically switch between these connections to communicate with the disjoint and/or isolated first and second network slices. In some embodiments, the UE may continue to establish a plurality of additional RRC connections and further cause switching between all of the established connections.

For example, if the UE is notified via the first RRC connection, which is the active connection at the time of the notification, that there is downlink data available from the second network slice then the UE may dynamically switch to the second RRC connection to receive the available downlink data. In another example, if all of the established RRC connections for all of the network slices are in the inactive state, or idle state, then a network entity (e.g., RAN, CN, AMF, the like, or combinations thereof) may be configured to cause paging procedures to notify the UE of the available downlink data along with network slice information with which the downlink data is associated.

FIG. 12 illustrates a flowchart of the operations of an example method 1200 performed by an example apparatus 200 which, in some embodiments, may be embodied by a network-based computing device, or other network entity, which may, in turn, be comprised of a computer program product comprising a non-transitory computer readable medium storing computer program code to be executed by processor 202. As shown in block 1202, apparatus 200 of this example embodiment incudes means, such as the processor 202, the memory 204, the communication interface 206 or the like, for establishing a first radio resource control connection between a user equipment and a first network slice, wherein the first radio resource control connection is associated with an active state or a connected state, wherein the active state or the connected state is configured to at least maintain a registration, and allow for communication transmissions, between the user equipment and a respective network slice. As shown in block 1204, apparatus 200 is further configured with means, such as the processor 202, the communication interface 206 or the like, for inactivating the first radio resource control connection, wherein the first radio resource control connection is switched to an inactive state, wherein the inactive state is configured to at least suspend a radio resource control connection between the user equipment and the radio access network while a context for the suspended radio resource control connection is retained, and a corresponding connection between a core network and the radio access network remains in the active state or connected state. As shown in block 1206, apparatus 200 is further configured with means, such as the processor 202, the communication interface 206 or the like, for re-activating a second radio resource control connection, wherein the second radio resource control connection is switched from the inactive state to the active state or the connected state.

As outlined by FIG. 12, one or more network entities, for example, a RAN or portion thereof (e.g., a gNB, NodeB etc.), is configured to establish a first RRC connection with a UE and further connect the UE to a first network slice. In some embodiments, the RAN may be configured to establish the first RRC connection in response to request from the UE. Upon establishment of the RRC connection the UE may request to initiate registration procedures with the first network slice. In some embodiments, the RAN or network slice may initiate the registration procedures. Upon completion of the registration, the first RRC connection is in the active state, or connected state. The active state, or the connected state, may be configured to at least maintain a registration, and allow for communication transmissions, between the user equipment and the first network slice. The UE may then request that the RAN inactivate the first RRC connection in order to establish a new RRC connection or re-activate. For example, the UE may request that a second, previously established, RRC connection be re-activated by the RAN and the RAN may switch the second RRC connection to the active state, or connected state. Then the UE may cause transmission of uplink data to a second network slice to access one or more services provided by the second network slice.

In some embodiments, the UE may generate uplink data via an application executed by the UE. In some embodiments, the UE may receive downlink data from the first network slice that needs to be processed further by a service of the second network slice, thus the UE would upload the received data to the second network slice. In some embodiments, while the RAN makes one or more RRC connections active or inactive based on the request of the UE, the connections between the RAN and the CN (e.g., one or more AMFs, etc.), associated with those RRC connections, is maintained via the RAN and the CN. In some embodiments, an RRC connection switched to the inactive state is suspended between the UE and the RAN, however, in such embodiments, the context for the inactive RRC connection is retained by one or more network entities (e.g., UE, RAN, etc.).

FIG. 13 illustrates a flowchart of the operations of an example method 1300 performed by an example apparatus 200 which, in some embodiments, may be embodied by a network-based computing device, or other network entity, which may, in turn, be comprised of a computer program product comprising a non-transitory computer readable medium storing computer program code to be executed by processor 202. As shown in block 1302, apparatus 200 of this example embodiment incudes means, such as the processor 202, the memory 204, the communication interface 206 or the like, for receiving, from a first access and mobility management function, first registration information associated with at least user equipment identification data and first network slice information. As shown in block 1304, apparatus 200 is further configured with means, such as the processor 202, the communication interface 206 or the like, for updating, based on the first registration information, a user equipment state to include at least the first network slice information. As shown in block 1306, apparatus 200 is further configured with means, such as the processor 202, the communication interface 206 or the like, for receiving, from a second access and mobility management function, second registration information associated with at least the user equipment identification data and second network slice information. As shown in block 1308, apparatus 200 is further configured with means, such as the processor 202, the communication interface 206 or the like, for updating, based on the second registration information, the user equipment state to include at least the second network slice information.

As outlined by FIG. 13, one or more network entities, for example, a server configured with at least a UDM, and/or one or more other network function (e.g., AMF, NSSF, etc.), is configured to receive and store network slice information associated with one or more UEs. In some embodiments, the UDM may store and/or update a UE connection state profile that records which AMFs have an established connection with the UE. In some embodiments, the UE connection state profile may include information indicating which AMF is serving which network slice to the UE. In some embodiments, the UE may be register with one or more AMFs and/or network slices. In some embodiments, a first AMF may serve a plurality of network slices to the UE and a second AMF may serve a disjoint and/or isolated network slice to the UE. The UDM may receive registration, state, and/or network slice information from an AMF when a UE first establishes a connection with the AMF. In some embodiments, the AMF may provide additional and/or updated registration, state, and/or network slice information to the UDM. In some embodiments, the AMF may provide additional and/or updated information in response to a detect trigger condition. For example, if a UE disconnects from an first AMF, the first AMF may notify the UDM that the first AMF is no longer serving the UE with the first network slice. Additionally, the UDM may still maintain that a second AMF is still serving the UE a second network slice.

FIG. 14 illustrates a flowchart of the operations of an example method 1400 performed by an example apparatus 200 which, in some embodiments, may be embodied by a network-based computing device, or other network entity, which may, in turn, be comprised of a computer program product comprising a non-transitory computer readable medium storing computer program code to be executed by processor 202. As shown in block 1402, apparatus 200 of this example embodiment incudes means, such as the processor 202, the memory 204, the communication interface 206 or the like, for maintaining, via a first access and mobility management function, a first registration state associated with at least a user equipment and a first network slice. As shown in block 1404, apparatus 200 is further configured with means, such as the processor 202, the communication interface 206 or the like, for maintaining, via a second access and mobility management function, a second registration state associated with at least the user equipment and a second network slice, wherein the first registration state and the second registration state are simultaneously maintained on a public land mobile network comprising a radio access network.

As outlined by FIG. 14, one or more network entities, for example, a server configured with one or more AMFs, and/or one or more other network functions, is configured to establish a connection with a UE and then register the UE with a network slice. For example, a first AMF may establish a first connection with a UE and then register the UE with a first network slice. A second AMF may establish a second connection with the UE and then register the UE with a second network slice. In some embodiments, there may be a plurality of other AMFs serving the UE with a plurality of additional network slices. Once the first and second AMFs have connected with and registered the UE, the first AMF may maintain a first registration state associated with the UE and the second AMF may maintain a second registration state associated with the UE. For example, if the UE causes switching between a first and second RRC connection with the RAN, then the first and second AMFs would maintain their respective registration state with the UE, even though one or more of the associated RRC connection may be inactive for the UE. In some embodiments, the first registration state and the second registration state are simultaneously maintained on a PLMN, or another network (e.g., a private network, etc.) comprising at least RAN and CN.

FIG. 15 illustrates a flowchart of the operations of an example method 1500 performed by an example apparatus 200 which, in some embodiments, may be embodied by a network-based computing device, or other network entity, which may, in turn, be comprised of a computer program product comprising a non-transitory computer readable medium storing computer program code to be executed by processor 202. As shown in block 1502, apparatus 200 of this example embodiment incudes means, such as the processor 202, the memory 204, the communication interface 206 or the like, for receiving, from a Network Slice Subnet Management Function (NSSMF), or the like (e.g., NSSF, etc.), network slice information for one or more network slices. As shown in block 1504, apparatus 200 is further configured with means, such as the processor 202, the communication interface 206 or the like, for generating a rejected single network slice selection assistance information list based on the received network slice information, wherein the rejected single network slice selection assistance information list indicates at least one network slice of the one or more network slices that requires a respective radio resource control connection. As shown in block 1506, apparatus 200 is further configured with means, such as the processor 202, the communication interface 206 or the like, for causing transmission, via a radio access network, of a registration accept message comprising the rejected single network slice selection assistance information list to a user equipment.

As outlined by FIG. 15, one or more network entities, for example, a server configured with one or more AMFs, NSSFs, NSSMFs, and/or one or more other network functions, is configured to retrieve and store information associated with one or more disjoint and/or isolated network slices that is locally stored on the network. For example, an AMF may receive a registration request from a UE identifying a plurality of network slices from which the UE is requesting service. The AMF may then request information from the NSSMF associated with one or more network slices identified by the UE's registration request. In response to the AMF's request for information the NSSMF may cause transmission of one or more S-NSSAI associated with the one or more network slices. The AMF may then determine that one or more network slices of the plurality of network slices requested by the UE are mutually exclusive (e.g., disjoint, isolated, etc.) and the AMF cannot server the UE with the plurality of network slices. For example, if the UE requested two disjoint network slices the AMF would only be able to server one of the two disjoint slices to the UE. Upon determining which network slice(s) can be served to the UE, the AMF may complete the registration process with the UE for the allowed network slices(s). The AMF, as part of the registration process, may cause transmission of a registration accept message to the UE, via the RAN. In some embodiment, the AMF may provide a rejected S-NSSAI list along with, or as part of, the registration accept message to the UE. The rejected S-NSSAI list would indicate to the UE which network slices cannot be served by the AMF because of the particular network slice deployment. The UE may then utilize the rejected S-NSSAI list to establish connections with one or more other AMFs in order to register with one or more other network slices specified on the rejected S-NSSAI list and receive services from the one or more other network slices.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, processes, or the like, required particular hardware such hardware may be considered as part of apparatus 200 for any such embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:
1. An apparatus comprising:
at least one processor; and
at least one memory including computer program code,
the at least one memory and the computer program code configured to, with the at least one processor, cause the apparatus at least to:
cause establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice;
cause inactivation, via the radio access network, of the first radio resource control connection, wherein the first radio resource control connection is switched to an inactive state, wherein the inactive state is configured to at least maintain the first radio resource control context with the radio access network; and dynamically cause re-activation, via the radio access network, of a second radio resource control connection, wherein the second radio resource control connection is switched from the inactive state to the active state or the connected state; and wherein the at least one memory and the computer program code are configured to, with the at least one processor, further cause the apparatus at least to:
receive, via the radio access network which is in the active state or the connected state, a downlink data notification, wherein the downlink data notification indicates that downlink data is available from the first network slice or the second network slice via a respective radio resource control connection;
cause re-activation, via the radio access network, of the respective radio resource control connection based on the downlink data notification; and
receive, via the radio access network, the downlink data.

2. The apparatus according to claim 1, wherein the at least one memory and the computer program code are configured to, with the at least one processor, further cause the apparatus at least to:
cause establishment, via the radio access network, of the second radio resource control connection to a second network slice, wherein the second radio resource control connection is associated with the active state or the connected state;
cause inactivation, via the radio access network, of the second radio resource control connection, wherein the second radio resource control connection is switched to the inactive state; and
dynamically cause re-activation, via the radio access network, of the first radio resource control connection, wherein the first radio resource control connection is switched from the inactive state to the active state or the connected state.

3. An apparatus comprising:
at least one processor; and
at least one memory including computer program code, the at least one memory and the computer program code configured to, with the at least one processor, cause the apparatus at least to:
cause establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice;
cause inactivation, via the radio access network, of the first radio resource control connection, wherein the first radio resource control connection is switched to an inactive state, wherein the inactive state is configured to at least maintain the first radio resource control context with the radio access network; and
dynamically cause re-activation, via the radio access network, of a second radio resource control connection, wherein the second radio resource control connection is switched from the inactive state to the active state or the connected state;
wherein the at least one memory and the computer program code are configured to, with the at least one processor, further cause the apparatus at least to:
generate uplink data, wherein the uplink data indicates the first network slice or the second network slice as a recipient for the uplink data to be transmitted via a respective radio resource control connection;
cause re-activation, via the radio access network, of the respective radio resource control connection based on at least the generated uplink data; and
cause transmission, via the radio access network, of the uplink data to the first network slice or the second network slice via the respective radio resource control connection.

4. An apparatus comprising:
at least one processor; and
at least one memory including computer program code, the at least one memory and the computer program code configured to, with the at least one processor, cause the apparatus at least to:
cause establishment, via a radio access network, of a first radio resource control connection to a first network slice, wherein the first radio resource control connection is associated with an active state or a connected state, wherein the active state or the connected state is configured to at least maintain a registration with, and allow for receiving transmissions from, a respective network slice;
cause inactivation, via the radio access network, of the first radio resource control connection, wherein the first radio resource control connection is switched to an inactive state, wherein the inactive state is configured to at least maintain the first radio resource control context with the radio access network; and
dynamically cause re-activation, via the radio access network, of a second radio resource control connection, wherein the second radio resource control connection is switched from the inactive state to the active state or the connected state;
wherein establishing the first radio resource control connection further comprises:
cause transmission, via the radio access network, of a first radio resource control connection request, comprising first network slice identification data and user equipment identification data, to the first network slice, wherein the first network slice identification data comprises single network slice selection assistance information;
receive, via the radio access network, a first radio resource control connection response, wherein the first radio resource control connection response confirms establishment of the first radio resource control connection to the first network slice; and
cause registration, via the first radio resource control connection, with a first access and mobility management function associated with the first network slice.

5. The apparatus according to claim 1, wherein establishing the second radio resource control connection further comprises:
cause transmission, via the radio access network, of a second radio resource control connection request, comprising second network slice identification data and user equipment identification data, to the second network slice, wherein the second network slice identification data comprises single network slice selection assistance information;
receive, via the radio access network, a second radio resource control connection response, wherein the second radio resource control connection response confirms establishment of the second radio resource control connection to the second network slice; and cause registration, via the second radio resource control connection, with a second access and mobility management function associated with the second network slice.

6. The apparatus according to claim 1, wherein the re-activation of an inactive radio resource control connection further comprises one or more of an inactivation or a disconnection of an active radio resource control connection.

7. The apparatus according to claim 1, wherein one or more of the first network slice or the second network slice are configured on one or more of a disjointed network or an isolated network.

8. The apparatus according to claim 1, wherein one or more networks comprising one or more of the first network slice or the second network slice further comprise one or more third network slices.

* * * * *